(12) United States Patent  
Stanz et al.

(10) Patent No.: US 7,536,294 B1  
(45) Date of Patent: May 19, 2009

(54) METHOD AND APPARATUS FOR TRANSLATING COMPUTER PROGRAMS

(75) Inventors: Brian Carl Stanz, Highlands Ranch, CO (US); Jason Michael Rice, Parker, CO (US)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 10/042,658

(22) Filed: Jan. 8, 2002

(51) Int. Cl.
G06F 17/24 (2006.01)
G06F 17/28 (2006.01)

(52) U.S. Cl. ............................ 704/3; 704/5; 707/203; 715/203

(58) Field of Classification Search ................ 704/1, 704/2, 3, 5, 7, 8, 9; 715/536; 707/203; 717/136, 717/137
See application file for complete search history.

(56) References Cited

U.S. PATENT DOCUMENTS

| | | | | |
|---|---|---|---|---|
| 4,599,612 A | * | 7/1986 | Kaji et al. | 345/635 |
| 4,791,587 A | * | 12/1988 | Doi | 704/2 |
| 4,866,670 A | * | 9/1989 | Adachi et al. | 704/5 |
| 5,251,130 A | | 10/1993 | Andrews et al. | |
| 5,349,368 A | * | 9/1994 | Takeda et al. | 345/684 |
| 5,351,189 A | * | 9/1994 | Doi et al. | 704/3 |
| 5,416,903 A | | 5/1995 | Malcolm | |
| 5,678,039 A | | 10/1997 | Hinks et al. | |
| 5,797,011 A | | 8/1998 | Kroll et al. | |
| 5,854,997 A | * | 12/1998 | Sukeda et al. | 704/3 |
| 5,978,754 A | * | 11/1999 | Kumano | 704/3 |
| 6,061,701 A | * | 5/2000 | Hirai et al. | 715/536 |
| 6,370,498 B1 | * | 4/2002 | Flores et al. | 704/3 |
| 6,442,516 B1 | * | 8/2002 | Lee et al. | 704/8 |
| 6,470,306 B1 | * | 10/2002 | Pringle et al. | 704/3 |
| 6,526,426 B1 | * | 2/2003 | Lakritz | 715/536 |
| 6,598,015 B1 | * | 7/2003 | Peterson et al. | 704/3 |
| 7,107,204 B1 | * | 9/2006 | Liu et al. | 704/2 |
| 7,383,542 B2 | * | 6/2008 | Richardson et al. | 717/137 |
| 2003/0200535 A1 | * | 10/2003 | McNamara | 717/137 |
| 2004/0111272 A1 | * | 6/2004 | Gao et al. | 704/277 |
| 2004/0260535 A1 | * | 12/2004 | Chen et al. | 704/9 |
| 2005/0091036 A1 | * | 4/2005 | Shackleton et al. | 704/9 |
| 2008/0300859 A1 | * | 12/2008 | Chen et al. | 704/7 |

* cited by examiner

Primary Examiner—Martin Lerner
(74) Attorney, Agent, or Firm—Townsend and Townsend and Crew LLP

(57) ABSTRACT

A method and an apparatus for facilitating the translation of computer programs from a source natural language into one or more target natural languages are provided. According to the present invention, development of a source computer program may proceed in parallel with translation of the source computer program into one or more target languages. According to the present invention, status records are updated from time to time, so that a complete and accurate translation of the source program into the target language or languages is obtained.

8 Claims, 39 Drawing Sheets

| Version | Include Table | Delta Table | Description | Status Description | Total Records | Change Records |
|---|---|---|---|---|---|---|
| XJDE0001 | Yes | F0004 | User Defined Code Types | Complete Success | 4190 | 43 |
| XJDE0001 | Yes | F0005 | User Defined Codes | Complete Success | 30930 | 623 |
| XJDE0001 | Yes | F00165 | Media Objects storage | Complete Success | 56077 | 0 |
| XJDE0001 | Yes | F0083 | Menu Text Override File | Complete Success | 8665 | 8 |
| XJDE0001 | Yes | F7920 | Resource Text Translation Work | Complete Success | 4090 | 719 |
| XJDE0001 | Yes | F79750 | Forms Design Aid Extracted Text | Complete Success | 140224 | 0 |
| XJDE0001 | Yes | F79760 | Report Design Aid Extracted Text | Complete Success | 91230 | 7 |
| XJDE0001 | Yes | F83100 | Date Title | Complete Success | 4 | 0 |
| XJDE0001 | Yes | F83110 | Column Headings | Complete Success | 1 | 0 |
| XJDE0001 | Yes | F9000 | Task Master | Complete Success | 17270 | 2 |
| XJDE0001 | Yes | F9005 | Variant Description | Complete Success | 104 | 0 |
| XJDE0001 | Yes | F9006 | Variant Detail | Complete Success | 0 | 0 |
| XJDE0001 | Yes | F9060 | Component Definition | Complete Success | 59 | 0 |
| XJDE0001 | Yes | F9061 | Workspace Definition | Complete Success | 7 | 0 |
| XJDE0001 | Yes | F9062 | Top-Level Navigation Icon Definit | Complete Success | 5 | 0 |
| XJDE0001 | Yes | F91100 | Favorites Relationships and Pro | Complete Success | 46 | 0 |
| XJDE0001 | Yes | F9202 | Data Field Display Text | Complete Success | 36134 | 552 |
| XJDE0001 | Yes | F9203 | Data Item Alpha Descriptions | Complete Success | 62474 | 1060 |
| XJDE0001 | Yes | F98306 | Processing Option Text | Complete Success | 25832 | 1904 |
| | | | | Total: | 477342 | 4918 |

Translation Tools - [Search and Replace]
File Edit Preferences Form Row Window Help General | Application | Search Text | Find/Replace

3700

Source Text  *Address*  — 3704
Target Text  *direc*  — 3708

Primary Search — 3712
● Source
○ Target

Secondary Search
☐ Case Sensitive  3716
☒ Equal To

| Source Text | Target Text | Product Code | Object Name | Form Name | Data Item |
|---|---|---|---|---|---|
| Display Address | Mostrar dirección | 01 | P0101S | W0101BA | ABADD |
| Display Address | Mostrar dirección | 01 | P0101SL | W0101SLB | ABADD |
| Address Book JDEM Search | Búsqueda JDEM del Libre de direcciónes | 01 | P0101SL | W0101SLB | |
| Display Address | Mostrar dirección | 01 | P0101SL | W0101SLA | ABADD |
| Work With Batch Addresses | Trabajo con direcciónes en batch | 01 | P01071 | W01071C | |
| Batch Address Book Revision | Revisión del Libro de direcciónes en batch | 01 | P01071 | W01071A | |
| Address Book | Libro de direc. | 01 | P01071 | W01071A | |
| Related Address | Dirección relacionada | 01 | P01071 | | |
| Work With Addresses | Trabajo con direcciónes | 01 | P01012 | W01012B | |
| Formatted Address | Dirección formateada | 01 | P01012 | W01012C | |

Source
Target
Status  0  Change Type  0  Skip Reason

Row 1

Work with Forms Design Aid Text | Search and Replace

Tools Form Row
Select

FIG. 38

METHOD AND APPARATUS FOR TRANSLATING COMPUTER PROGRAMS

FIELD OF THE INVENTION

The present invention relates to the translation of natural language portions of computer programs. In particular, the present invention relates to the translation of natural language text into one or more target natural languages, concurrently with the development of the source program.

BACKGROUND OF THE INVENTION

Computer programs are increasingly important to the efficient operation of business enterprises throughout the world. For business enterprises having operations located in various parts of the world, it is desirable to provide software having natural language text that has been translated into languages that are local to the area in which the end user is located. Accordingly, it is necessary to translate natural language portions of computer software into languages other than the language used by the original programmers.

For computer programs intended for use in many different areas around the world, a very large number of natural language translations are necessary. Accordingly, significant man hours must be expended in order to prepare such translations.

In a typical software development process, a version of a computer program is written using an original or source natural language (e.g., English). The source language program is then refined until it is deemed ready for commercial use, at which point the software product is finalized or mastered. Translation of natural language portions of the original program into other languages (e.g., German and Spanish) may then be undertaken after mastering of the original program. Because translation does not begin until the original program has been finalized, delays in bringing versions of the product to market in languages other than the source language can be significant.

In addition to delays in bringing translated programs to market, traditional approaches to preparing translations have been difficult to implement. This is because computer programs typically draw text from many different sources. Therefore, ensuring that all portions of natural language text associated with a computer program have been translated into a target language is an arduous and time consuming process.

In addition to difficulties ensuring that all of the natural language text has been translated, traditional methods for preparing translated computer programs have often resulted in inaccurate translations. This is because the context in which portions of natural language text are used in an application are often unavailable to the translator. As a result, the translation entered by a translator may be inappropriate when the translated text is seen in the context of its use in the computer program. In particular, the traditional method of considering natural language text as it appears in source tables, rather than in the context in which such language text will appear to the end user, may result in unsatisfactory translations.

Therefore, it would be highly desirable to provide a new system for preparing natural language translations of computer programs. In particular, it would be desirable to provide a system that allowed translations of natural language text contained in a computer program to be prepared concurrently with development of the original or source program. In addition, it would be desirable to provide such a system that allowed changes to the source text and changes to the translated text to be tracked, to avoid duplication of effort and to ensure that the translated portions of text accurately reflect the final version of text in the source program. Furthermore, it would be desirable to provide such a system that allowed a translator to view the context in which portions of natural language text appear in the computer program.

SUMMARY OF THE INVENTION

In accordance with the present invention, a system for translating natural language portions of computer programs is provided. The present invention allows translations of natural language text included in a source computer program to be performed, even while development of the source computer program is on-going. Furthermore, translations of text in a source computer program that become obsolete can be tracked, and any such translation may be beneficially applied in preparing a new or updated translation. The present invention also provides metrics regarding the translations of source text to assist translators in managing work flows.

According to the present invention, changes to textual portions of a source computer program written in a source language are made in a production copy of the source computer program. The production copy is periodically compared to a comparison copy. During such a comparison (or delta process), one or more status tables are updated to reflect the most recent changes made to records containing text in the source computer program. A status table is maintained for each target language for which a translation of the source computer program is being prepared. The status table or tables contains information regarding whether or when records containing the most recent translations of portions of the source computer program's natural language text have been translated into the particular target language. In particular, the status table or tables indicates whether a portion of natural language text has been translated from the source language, and whether changes have occurred with respect to records that were previously translated. Translated text is stored as part of a target version of the computer program. In general, a different target computer program is prepared for each translation of the source program into a target language.

According to an embodiment of the present invention, the status table is updated periodically, so that translators can respond to changes to or additions of natural language text records contained in the source computer program. As natural language text records are translated, updates are made to the status table or tables. Accordingly, translators can track how much natural language text remains to be translated from the source program. In addition, the status table or tables may be used to store information regarding the level of review received by translated natural language text records, to facilitate the preparation of accurate translations.

In accordance with yet another embodiment of the present invention, revisions to or additions of records containing text in the source computer program are detected when the periodic comparison operation is performed. The status table may then be updated to notify translators that modifications are necessary. When selecting a modified record or portion of text for translation, the translator may be presented with the translation of the previous version of the text, to assist the translator in preparing the new version. In addition, the source text may be presented to the translator in a box adjacent to an edit box for entering or editing the translated version of the text (i.e. the target text).

In accordance with still another embodiment of the present invention, a translator may view a portion of text as that text would appear to a user running the computer program. This capability may be provided for both source text and target text. In addition, both the source version and target version of the text may be viewed by a translator in the context of how they will appear to users of the respective computer programs, to assist the translator in preparing an accurate translation.

In accordance with still another embodiment of the present invention, a translator may select a portion of text for translation or re-translation. Upon selection of a portion of text, the translator is presented with that portion of text in the source language, and with any previously prepared translation or partial translation of that text into the target language that the translator is working with, if available. The translator is additionally provided with an edit box to allow the translator to enter a translated version of the text, or to edit a previous translation of that text. According to still another embodiment of the present invention, the translation of text may be automated by providing suggested translations. Such suggested translations may be obtained from previous translations of identical or similar portions of text that have already been prepared in connection with the computer program. According to yet another embodiment of the present invention, spell checking capabilities may be provided for the translated text.

An apparatus for providing a system in accordance with the present invention may comprise a processor and software operable on the processor to enable the creation of status records, and the retrieval of records containing source text and corresponding translated text related to a computer program. The source computer program from which text to be translated is obtained, and the portions of text translated into a target language, are maintained on one or more storage devices. In addition, status tables containing information related to the history of changes and additions to the source text and to translations of the source text are also maintained on one or more storage devices. The apparatus may comprise a number of interconnected computing devices.

Based on the foregoing summary, a number of salient features of the present invention are readily discerned. A system and a method for facilitating the translation of natural language text portions of computer programs into one or more target languages is provided. According to the present invention, a status table comprising a record of changes made to the source text is maintained for each target language, to allow a thorough translation of the source program into those target languages. In particular, the status table or tables comprise a record of translated text records, to provide an indication of records containing text remaining to be translated, and of records containing text that have been updated in the source program and thus require retranslation. Furthermore, the present invention allows the translator to view the source text concurrently with the translated text, and additionally allows the translator to view the source text and the translated text in the context of the computer program, as that text will be seen by the end user. In addition, the present invention automates the translation process, facilitating the preparation of accurate translations in a timely manner.

Additional advantages of the present invention will become readily apparent from the following discussion, particularly when taken together with the accompanying drawings.

BRIEF DESCRIPTION OF THE DRAWINGS

FIGS. 8-38 are screen shots of window displays illustrating translation-related operations using a translation application in accordance with an embodiment of the present invention.

DETAILED DESCRIPTION

Figure 1:
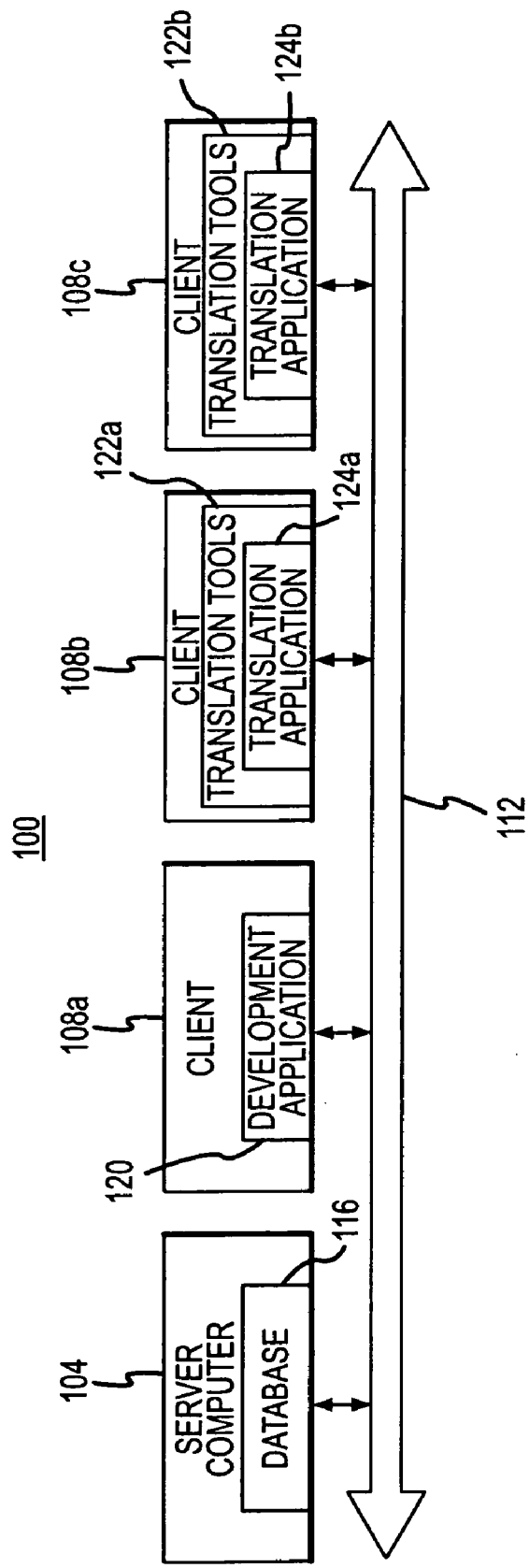
FIG. 1 is a block diagram of a computer system in accordance with an embodiment of the present invention.

With reference now to FIG. 1, a computer system 100 in accordance with an embodiment of the present invention is illustrated. In general, the computer system 100 includes at least a first server computer 104, and a plurality of client computers 108. The server computer 104 and the client computers 108 are interconnected to one another by a computer network 112. In general, the computer system 100 may include a number of server computers 104, and a lesser or greater number of client computers 108. In addition, the present invention may be implemented using a single computer (e.g., a computer 104 or 108).

In the computer system 100 illustrated in FIG. 1, the server computer 104 is shown as providing storage for a database 116. The database 116 may generally include tables and records used in connection with the development of a source computer program and with translations of the source computer program into one or more target languages. The first client computer 108a is shown as providing the resources necessary for operating a development application 120. In general, the development application 120 facilitates the development and eventual mastering of the source computer program. The second client computer 108b is shown in FIG. 1 as providing resources required for operation of a translation tools system 122a, including a translation application 124a. As will be described in greater detail below, the translation tools system 122 and the translation application 124a facilitate the development of translations of the source computer program into one or more target languages. As illustrated in FIG. 1, additional copies of the translation tools system 122 and translation application 124 may be run on other client computers 108. For example, a second copy of the translation tools system 122b and the translation application 124b may be operated on a third client computer 108c. The first 124a and second 124b copies of the translation application may be operated concurrently with respect to the translation of the source computer program into one or more target languages.

Figure 2:
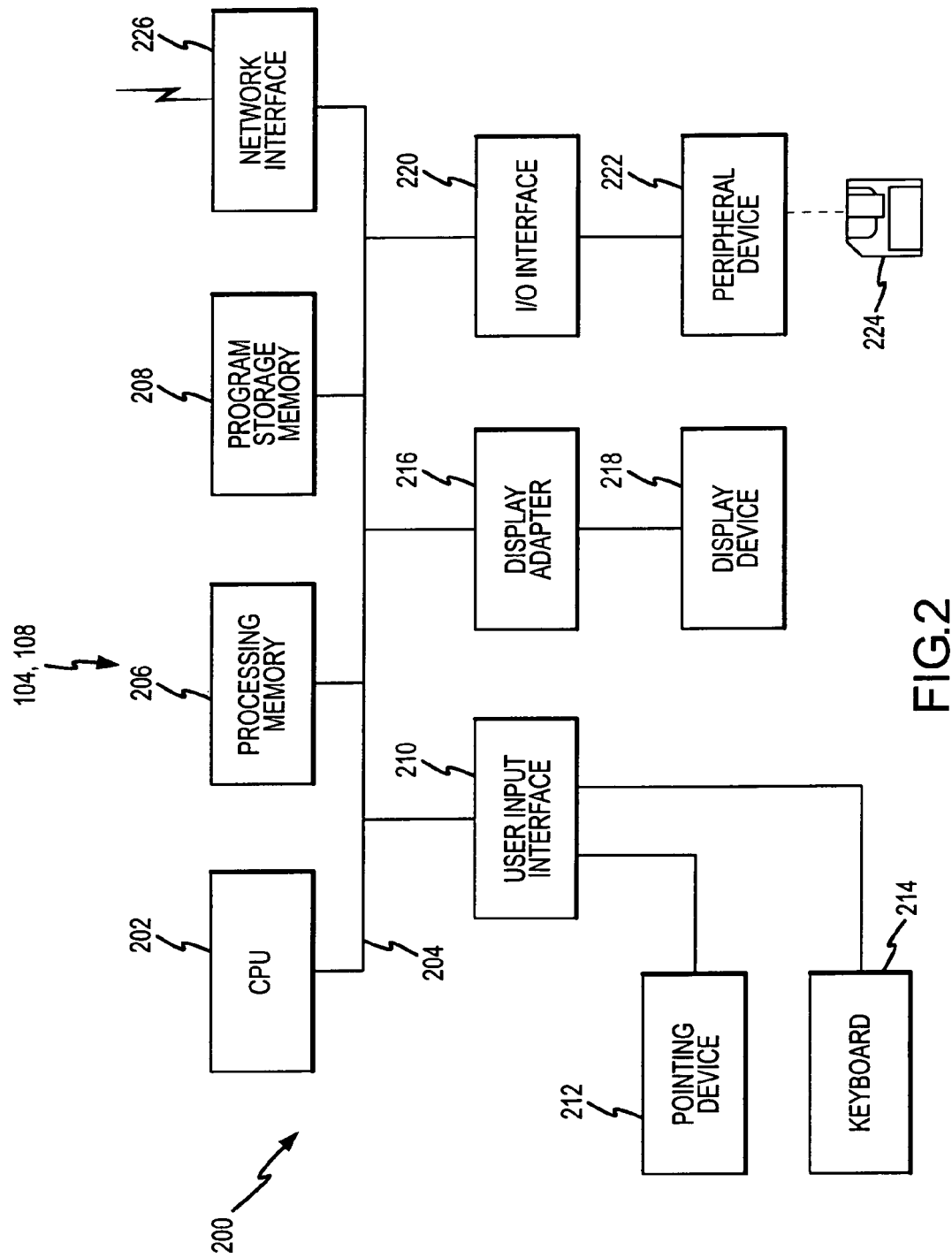
FIG. 2 is a block diagram of a general purpose computer for use in connection with the system of FIG. 1.

With reference now to FIG. 2, a typical computer 104, 108 in accordance with an embodiment of the present invention is illustrated. In general, the computer 104, 108 includes a central processing unit (CPU) 202 connected by a bus 204 to a processing storage or memory device 206, for example RAM, and to a program/data storage or memory device 208, for example one or more hard disk drives. The computers 104, 108 may be conventional personal computers, work station machines, mid-range computer platforms or large system computer platforms, and use conventional software operating environments depending on the available hardware platform. For example, the OS/400 operating system from IBM Corporation of Armonk, N.Y. may be used with an AS/400 mid range computer also from IBM Corporation; the HP-UX operating system from Hewlett Packard Corporation of Palo Alto, Calif. may be used with an HP-9000 mid range computer also from Hewlett Packard Corporation; or the WINDOWS NT SERVER operating system from Microsoft Corporation of Redmond, Wash. may be used with a personal type computer. The computers 104, 108 may also operate on other conventional software operating environments such as Windows 98, Windows 2000, Windows NT or Windows ME, all from Microsoft Corporation; UNIX, from X/Open Company Limited; or SOLARIS, from Sun Microsystems, Inc. of Palo Alto, Calif. operating environments.

The CPU 202 may be a conventional, commercially available processor such as a PENTIUM processor from Intel Corporation of Santa Clara, Calif., or SPARC processor from Sun Microsystems, Inc. of Mountain View, Calif. It should be appreciated that the computers 104, 108 may be of differing configurations and use different operating systems in communication with one another.

A user input interface 210, connected to the bus 204, is provided to enable users to input data via a pointing device 212, such as a mouse, and via a keyboard device 214. To provide a visual display, the computer 104, 108 also includes a display device 218 connected to the bus 204 through a display adaptor 216.

An input/output (I/O) interface 220 may be connected to the bus 204 to permit a peripheral device 222 to interface with the computer 104, 108. The peripheral device 222 may include a disk drive for reading and or writing electronic information to computer useable storage medium, such as a magnetic disk 224. Other peripheral devices, including tape drives and compact disk drives, can also be incorporated into the computer 104, 108.

A network interface 226 is connected to the bus 204 to enable the computer 104, 108 to access the network 112 (FIG. 1). The network 112 may be a conventional logical network, such as a local area network (LAN), or wide area network (WAN), and is implemented using commercially available network hardware and software. In addition, it should be appreciated that the computer network 112 may comprise a plurality of different networks 112, and may include the Internet, or a private intranet.

The inventors of the present invention have recognized that the timely translation of natural language text contained in a source computer program from a source language into one or more target languages is facilitated if translations of records containing natural language text from the source language are prepared while the source program is in development. In particular, the timely preparation of translations of computer programs is advanced if translations (i.e., the preparation of versions of the source program for users of a target natural language) proceed in parallel with development of the source program, and prior to finalization of the source program. Therefore, the invention disclosed herein provides a system and a method by which the translation process can be managed efficiently to obtain translated text, and a system and a method that are capable of providing metrics regarding translation tasks that remain to be completed to assist in the allocation of workloads.

Figure 3A:
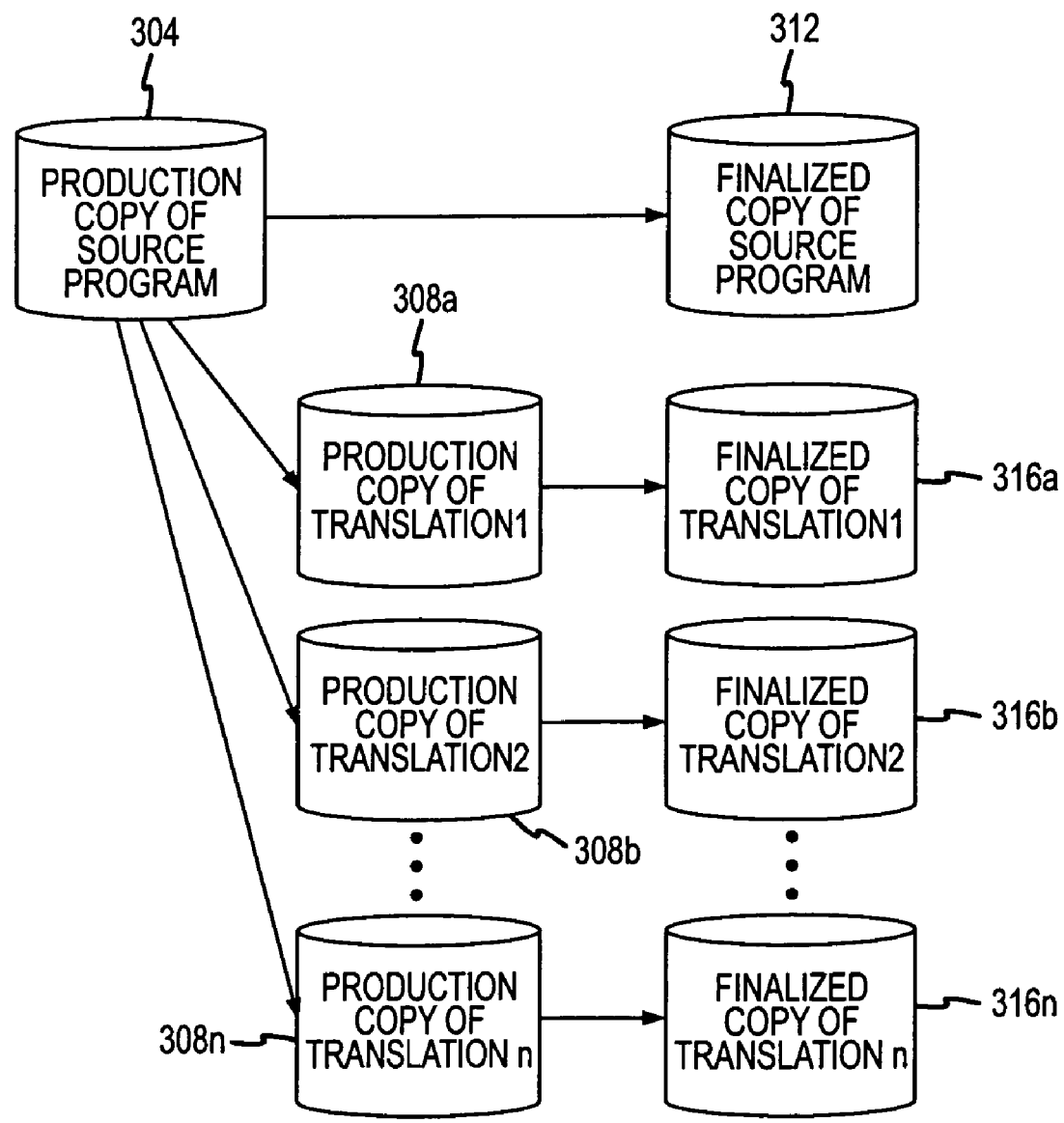
FIG. 3A is a block diagram depicting the development of a source computer program and translations of that source computer program into various target languages.

With reference now to FIG. 3A, the development of a source computer program and of translations of that source computer program into various target languages is illustrated. Initially, a production copy of the source computer program 304 is developed. From the production copy of the source computer program 304, production copies 308 of translations of the source computer program into various target languages are prepared. According to the present invention, the preparation of production copies of translations 308 of the source computer program may be initiated prior to the development of a finalized copy of the source program 312. Accordingly, as the production copy of the source computer program 304 evolves in the development process, the production copies of the translations 308 of the source program must be revised to track the changes to the production copy of the source program 304. After development of the production copy of the source program 304 is complete, a finalized or master copy of the source program 312 may be released to end users. Similarly, when production copies of the translations 308 of the source program are complete, finalized copies of the translations 316 can be released to end users. In FIG. 3A, translations of the source computer program 304 into three different target languages are illustrated. Of course, a greater or lesser number of translations may be prepared in connection with the present invention. As an example of typical natural languages involved in such a translation process, the source computer program 304 may be prepared using English, while the first target language used in connection with the preparation of the first translation 308a and the finalized copy of the first translation 316a may be Spanish. As a further example, the second target language 316b may be German, and the third 316c Japanese.

Figure 3B:
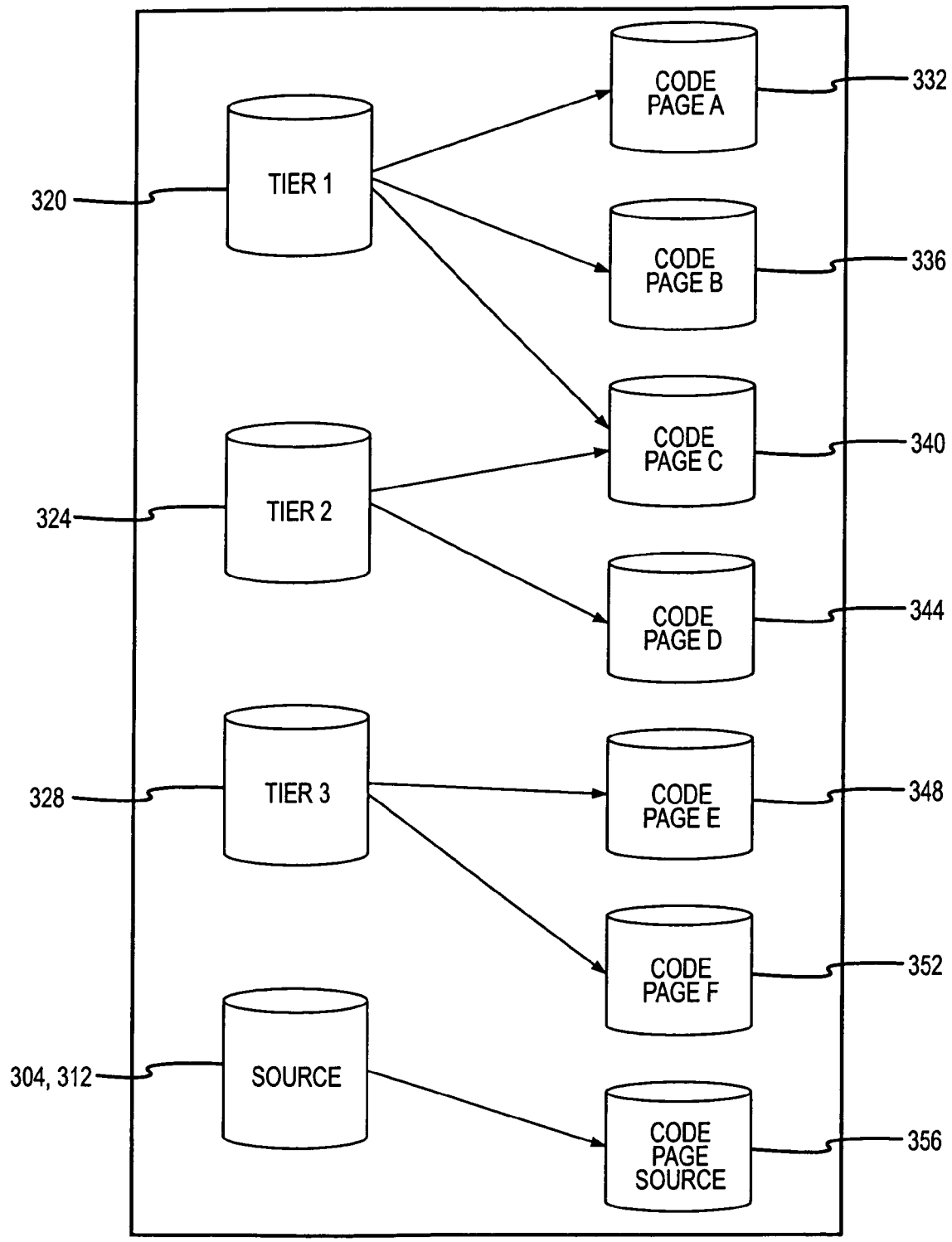
FIG. 3B illustrates an arrangement of data in accordance with an embodiment of the present invention.

With reference now to FIG. 3B, an arrangement of data in accordance with an embodiment of the present invention is illustrated. In general, the translation of natural language portions of computer program text into natural languages other than the source natural language is a time consuming, resource intensive process. The task of translating a computer program from a source natural language into a number of different target natural languages can be made more manageable by prioritizing the desired translations. For example, languages other than the source language used in major markets for the computer program can be assigned to a first tier 304 of languages. In general, target natural languages included in the first tier have translation resources allocated to them so that translations of the source computer program into those target natural languages are obtained relatively quickly. For example, in accordance with an embodiment of the present invention, translations of textual portions of the computer program into tier one 320 languages are scheduled to be available when the finalized version 312 of the source computer program, containing text portions in the source natural language, is available. Target languages of lesser importance than those assigned to tier one 320 status may be assigned. For example, it may be desirable to eventually provide a translation of a computer program into some additional languages. However, the market importance of versions of the computer program in those languages may still be relatively small. Therefore, the deployment of translations into such languages is of lesser importance. Accordingly, such languages may be assigned tier two 324 or tier three 328 status. Of course, a lesser or greater number of tiers may be established, depending on the translation needs and schedule associated with a particular computer program. For instance, different tiers need not be established if the translations of a source computer program are scheduled to be released at the same time or if the number of target languages (i.e., the number of translations that need to be prepared) is small.

Although the division of translation tasks into categories of importance, as represented by the formation of tiers 320, 324 and 328 of natural languages, aids in organizing the task of preparing such translations, any translation requires that the source text first be generated. However, as can be appreciated by one of skill in the art, the generation of source text in a computer program is an iterative, evolutionary process. Accordingly, natural text portions of computer programs are typically fluid, and can change up until the last moment before a finalized or mastered version of the source computer program is released to end users. Accordingly, a system for providing translations of such text should be capable of ensuring that complete translations of the source text into one or more target languages are available at about the same time that the source, or original, version of the computer program is available to end users. Furthermore, although the importance of translations into different target languages can be prioritized, and those languages having a higher priority can be given greater resources for completing a translation, it can be appreciated that allocating the resources required for preparing translations into different target languages may involve assigning a relatively large number of translators to prepare the translation of a computer program into a first, tier one, target language, and a relatively small number to the translation of a source program into a second, tier two, target language. Accordingly, it can be appreciated that the translation of a source computer program into target languages often requires managing parallel processes that proceed at different rates.

Discrete portions of natural language text for use in connection with a computer program may be stored as text records. In general, for each source language text record, a corresponding target language text record is generated for each target language. Therefore, in addition to managing translation tasks that proceed in parallel with development of a source computer program, the efficient administration of translation tasks requires that the status of large numbers of text records be tracked. This task can be further complicated if the different versions of a computer program (i.e. the source version and various target versions) are implemented using different code sets. For example, an English language source program will typically be implemented using a different code set than is used to implement a Japanese language target version of the computer program. Therefore, as illustrated in FIG. 3B, tiers of languages 320, 324 and 328 may be further divided into different code pages 332 to 352. In addition, the source computer program 304, 312 may be stored in a dedicated code page 356. Thus, the accurate tracking of translation tasks requires that the status of records stored utilizing different code pages be tracked. The division of text into different code pages facilitates the production of translated computer programs that are defect free, by removing the need to convert the code from one version to another. Therefore, although the use of different code pages 332-352 complicates the administration of translation tasks, it generally results in fewer errors in the computer code used to implement the different language versions of the computer program. Of course, the division of the source computer program and translations of the source program among different code pages 332-356 is not necessary. For example, in accordance with another embodiment of the present invention a single code page is used in connection with the source computer program and the translations of that program.

Figure 4:
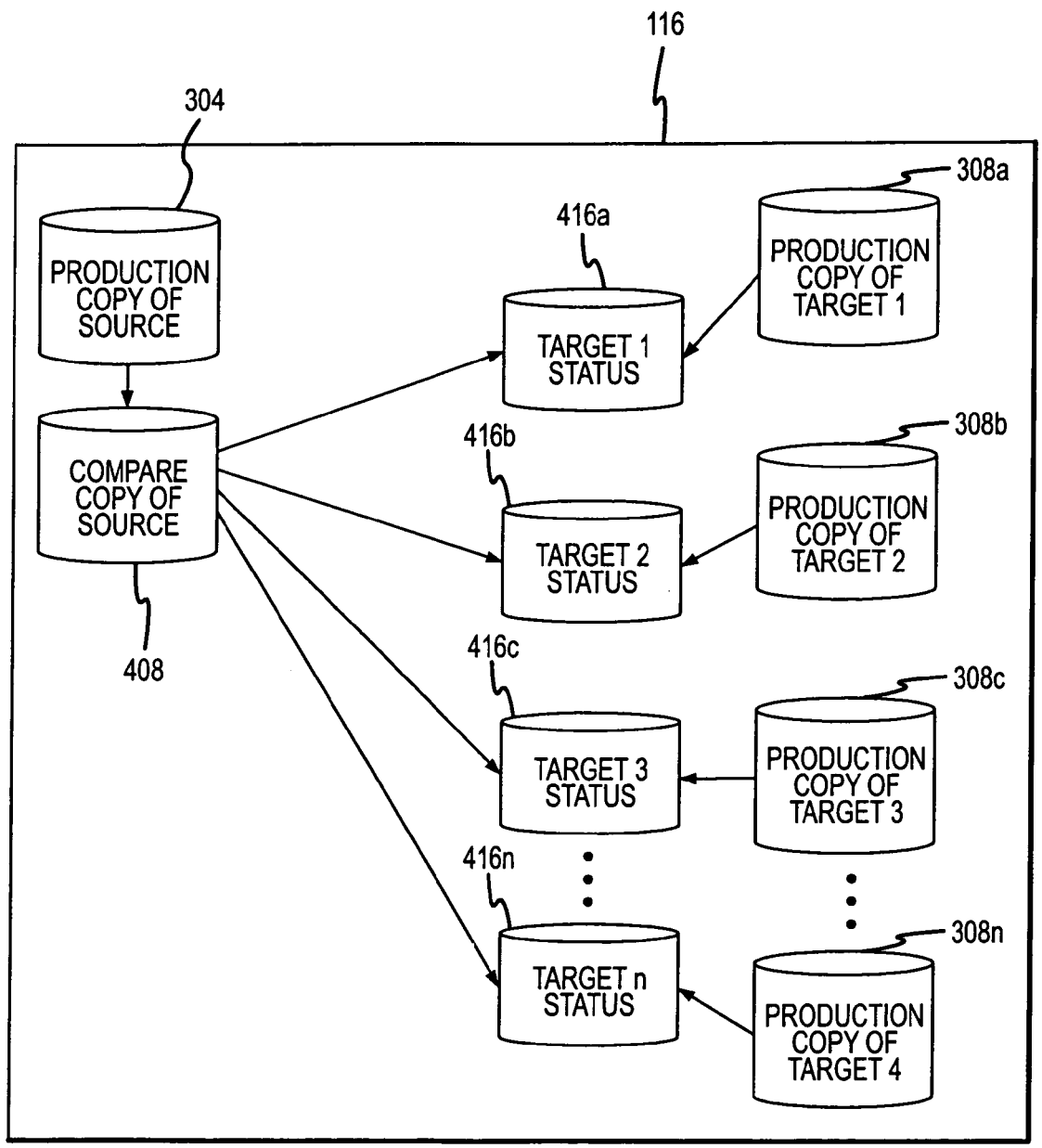
FIG. 4 illustrates the relationship between various records and tables utilized in connection with an embodiment of the present invention.

With reference now to FIG. 4, the contents of the data base 116 used to store various information utilized by a system in accordance with an embodiment of the present invention is illustrated. In general, and as can be understood by one of ordinary skill in the art, the database 116 may be implemented on or in connection with one or more computers 104, 108 included in the system 100. For example, and as shown in FIG. 1, the database 116 may be stored in the program storage/data or memory 208 associated with a server computer 104.

The database 116 includes a production copy of the source computer program 304. The production copy 304 of the source computer program is used by the developers of the original or source computer program as the working copy of that program. Accordingly, work in developing the source computer program, including changes to the look and feel of that program, are completed in connection with the production copy 304. Furthermore, development of the source computer program may be performed in connection with a development application 120.

The compare copy of the source program 408 is used in connection with the development of translations of the source computer program into one or more target languages. For example, if the source computer program 304 includes English language text, that text may be translated into German, French, Spanish and Japanese. In general, the compare copy of the source program 408 is generated or updated from time to time by copying the then current version of the production copy of the source program 304.

The status table 416 established for each translation into a target language contains information related to the status of records of source text included as part of the compare copy of the source program 408. For example, the status tables 416 may include information regarding events concerning records such as the date that a record in the current compare copy of the source computer program 408 was created and the date on which that record was most recently edited, if any. In general, the status tables 416 are updated each time a new compare copy of the source computer program 408 is generated.

The status tables 416 also store information related to the corresponding translation of the compare copy of the source program 408 into a target language. Accordingly, the target 1 status table 416*a* contains information regarding the status of the translation of the source program into a first target language. Similarly, the second status table 416*b* contains information related to the status of the translation of the source program into the second target language. In general, during a comparison or delta process, the production copy 304 is compared to the current compare copy of the source computer program 408, and the status records 416 are updated as a result of the comparison. Accordingly, the information contained in the status tables 416 is related to at least the most recent addition or revision of the text contained in each record of natural language text included in the compare copy of the source computer program 408. In addition, the information in each status table 416 relates to the status of the translation of the records of natural language text included in the current compare copy of the source computer program 408 into the corresponding target language. In particular, the status tables 416 each contain information regarding whether particular records in the current compare copy of the source computer program 408 have been translated into the relevant target language, and whether the records in the compare copy 408 have been revised since any translation of the record into the relevant target language.

The database 116 additionally includes production copies of the translated computer program 308. In general, a production copy of the translated computer program is maintained for each target language. The production copies of the translations of the computer programs 308, in addition to the translated natural language text, include copies of any programming code associated with the records containing natural language text. This facilitates the preparation of finalized copies of the translated computer program 316, as it removes the need to perform conversions of data before the translated computer program can be released to end users as a finalized version 316. Accordingly, a source of errors that may be introduced in the creation of translated computer programs has been removed by the present invention.

Figure 5:
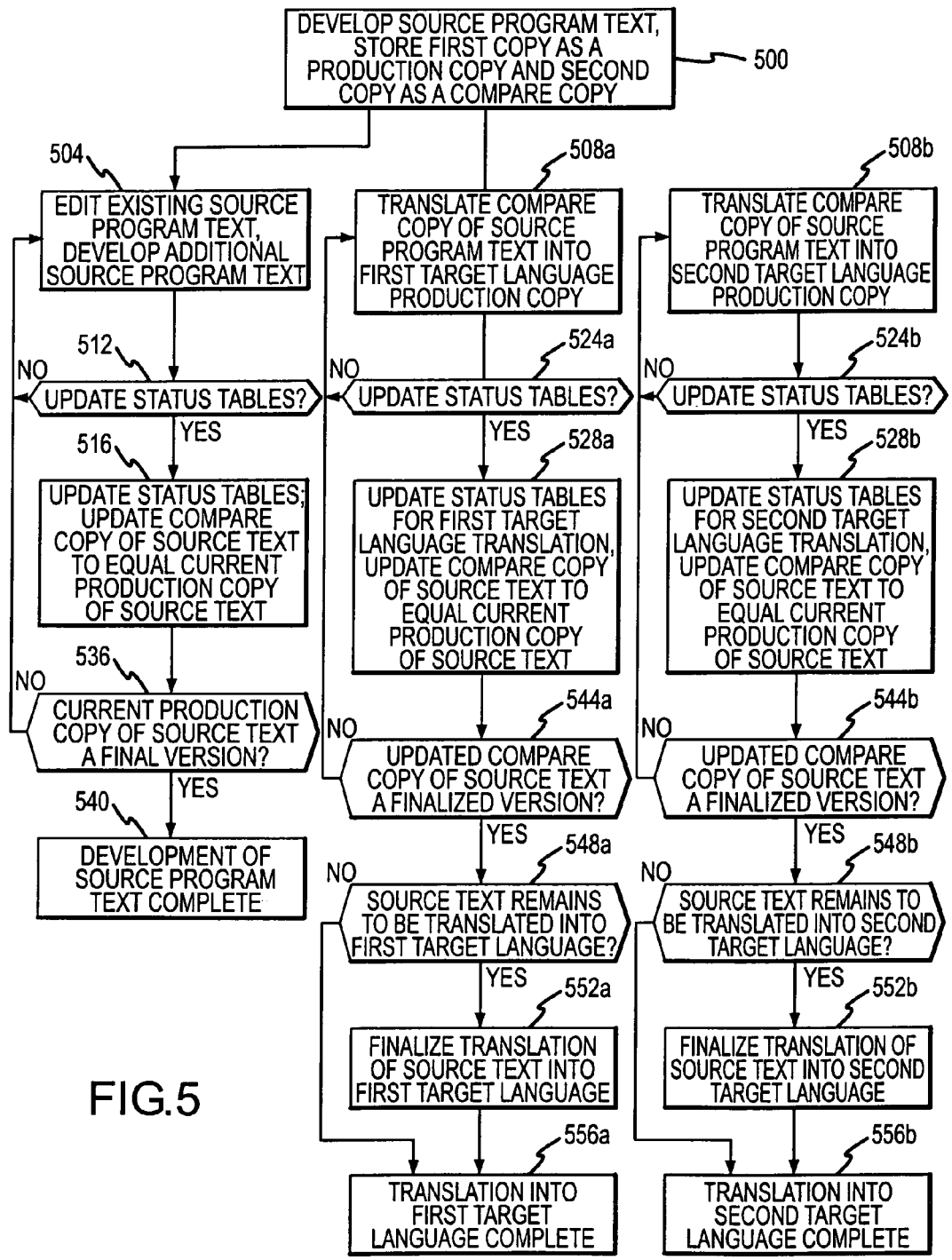
FIG. 5 is a flow chart illustrating the development of translated computer programs in accordance with an embodiment of the present invention.

With reference now to FIG. 5, a flow chart illustrating the development of translated computer programs in accordance with an embodiment of the present invention is illustrated. Initially, at step 500, source program text is developed as part of a source computer program. A first copy of this source program text is stored as a production copy 304 of the computer program, and a second copy of the source program text is stored as a compare copy 408. At step 504, the existing source program text is edited, and additional source computer program text may be developed.

At step 508, the compare copy 408 of the source program text may be translated into one or more target languages to produce a target language production copy 308 of the computer program. Accordingly, development of the production copy of the source computer program 304 may proceed in parallel with translation of the current iteration of the compare copy 408 of the source computer program. In FIG. 5, the compare copy 408 of the source program text is illustrated as being translated into first (at step 508a) and second (at step 508b) target languages. Of course, as can be appreciated by one of skill in the art, the present invention may be utilized in connection with the translation of the textual portions of a computer program from a source language to a single target language, or to more than two target languages.

In general, until a decision is made to update the status tables 416, developers may continue to edit the existing source program (step 504). However, from time to time, it is desirable to run a compare or delta process to update the status tables 416 and to provide an updated compare copy 408 of the source computer program from which translators preparing translations of the source computer program into a target language can work. Updates of the status tables 416 may be performed periodically, according to a predetermined schedule, or in response to changes in the status of the development process. For example, early in a development cycle, when the addition of large numbers of records containing natural language text requiring translation can be expected, the update of the status tables 416 can be performed relatively infrequently (e.g., every two weeks). Later on in the development cycle, as development shifts more towards revisions of existing records, updates of the status tables 416 may be performed more frequently (e.g., once a week). Furthermore, it can be appreciated that updates may be performed at different time intervals depending on the work load of the translators. For example, when a large number of existing records of natural language text require translation, there is generally less impetus to devote system resources to updating the status tables 416. However, as the number of records containing natural language text requiring translation is reduced, there is more impetus to update the status tables 416.

After a decision to update the status records has been made at step 512, the status tables 416 are updated, and the compare copy 408 of the source computer program text is set equal to the current production copy 304 of the source computer program text (step 516).

In FIG. 5, step 524 regarding the decision to update the status tables 416 corresponds to step 512. That is, step 512 shows the relationship of the step of running the compare process to the other steps involved in the development of the source program text, while step 524 shows the relationship of the step of running the compare process to the other steps involved in the development of translated versions of the computer program. Accordingly, until the decision to update the status tables 416 is made, the translation process or processes remain at step 508. Upon a decision to update the status tables 416, the status of each record in the production copy 308 of each target language translation is updated (step 528). Also at step 528, the compare copy 408 of the source computer program text is updated to equal the current production copy of the source computer program 304 text. Accordingly, step 528 corresponds to step 516, and shows the step of updating the status tables 416 and the compare copy 408 of the source computer text in the context of developing translations of the first computer program.

Returning to consideration of the development of the source computer program in the source natural language, at step 536, a determination is made as to whether the current production copy of the source computer program text is a final version. If not, the development of the source computer program continues at step 504. If the current production copy of the source computer program text is to be released as a finalized version, then the development of a source program text is complete (step 540). Of course, development of follow-on versions of the source program text may continue, as can be appreciated by one of skill in the art.

With respect to the translations of the natural language text records included in the source program, if the updated compare copy received following an update of the status records is not a finalized version (step 544), translation of the updated compare copy proceeds at step 508. If at step 544 it is determined that the updated compare copy of the text in the source computer program represents a finalized version, a determination is next made as to whether any records of natural language text included in the source computer program remain to be translated into the relevant target language (step 548). If records remain to be translated, then the translation of the records containing natural language text into the relevant target language is finalized (step 552). After finalization of the translation at step 552, or after determining at step 548 that no records containing natural language text remain to be translated, the translation into the relevant target language is complete (step 556).

Figure 6:
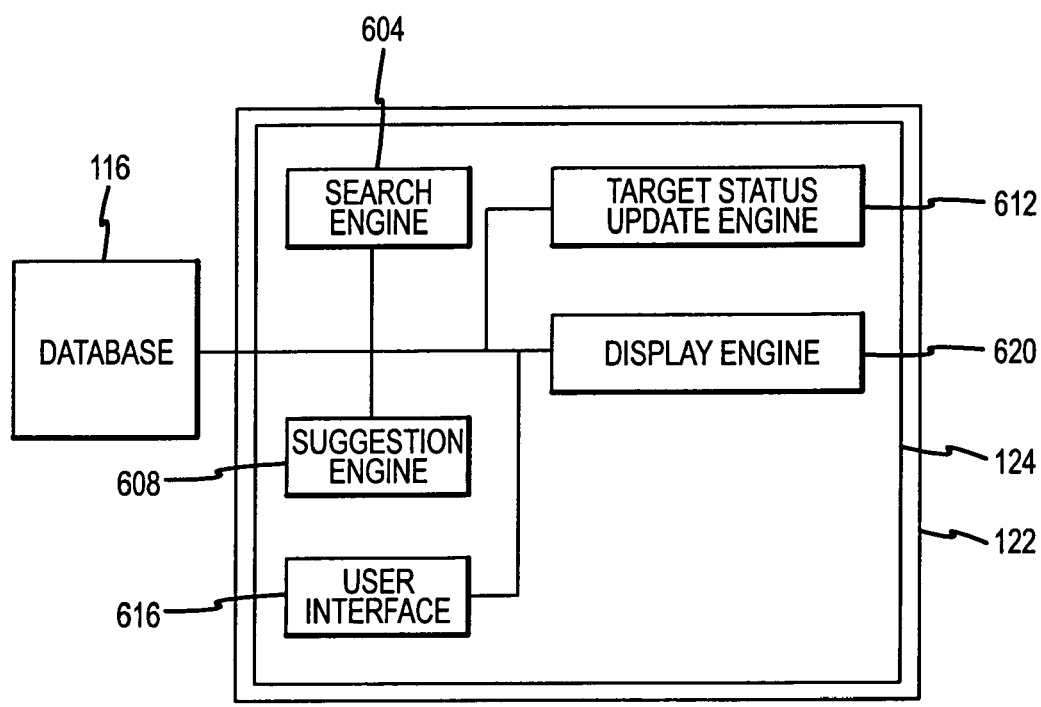
FIG. 6 is a block diagram depicting certain functional aspects of a translation application in accordance with an embodiment of the present invention.

With reference now to FIG. 6, a translation application 124 included as part of a translation tools system 122, such as may be run in connection with a client computer (e.g., client computer 108b in FIG. 1) is shown operatively connected to a database 116 (e.g., operating on a server computer 104 in FIG. 1). In general, the translation application 124 performs functions to assist a translator in translating records of natural language text from a source language to a target language. Accordingly, the functions of the translation application 124 may include a search engine 604, for displaying a selected set or sets of records to the translator; a suggestion engine 608 for providing suggested translations of natural language text; a status table update engine 612 for updating the relevant status table 416 in response to actions performed by the translator in connection with the translation application 124; a user interface 616 for receiving commands and data from the translator; and a display engine 620 for displaying information to the translator, including records containing natural language text.

It should be understood that FIG. 6 includes illustrations of basic functions that may be performed by the translation application, and that such illustration is not exhaustive of the functions capable of being performed by the translation application 124.

Using the translation application 124, a translator may access various information. For example, the translator may view records containing natural language text having a selected status. The translator may also choose to view summaries of selected data, including records and information regarding the number of records included in a selected category, and the status of those records. The translation tools application 124 also allows a user to view the contents of a selected record, and allows a translator to view the contents of a selected record in the context of the computer program. The translation application 124 may also be used to provide a display of record statistics and metrics, such as the number of records having a particular status.

Figure 7:
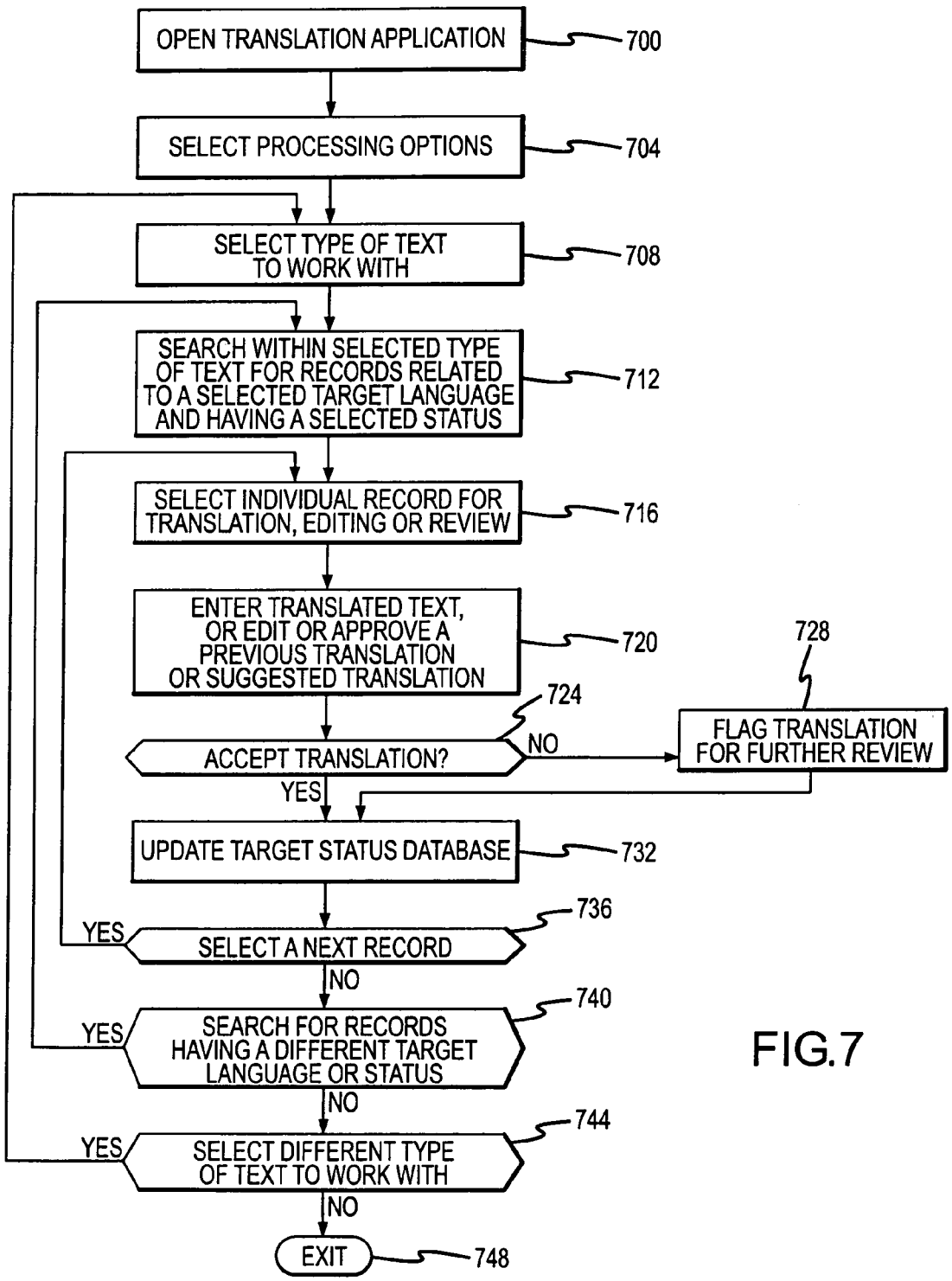
FIG. 7 is a flow chart illustrating a translation process in accordance with an embodiment of the present invention.
Figure 8:
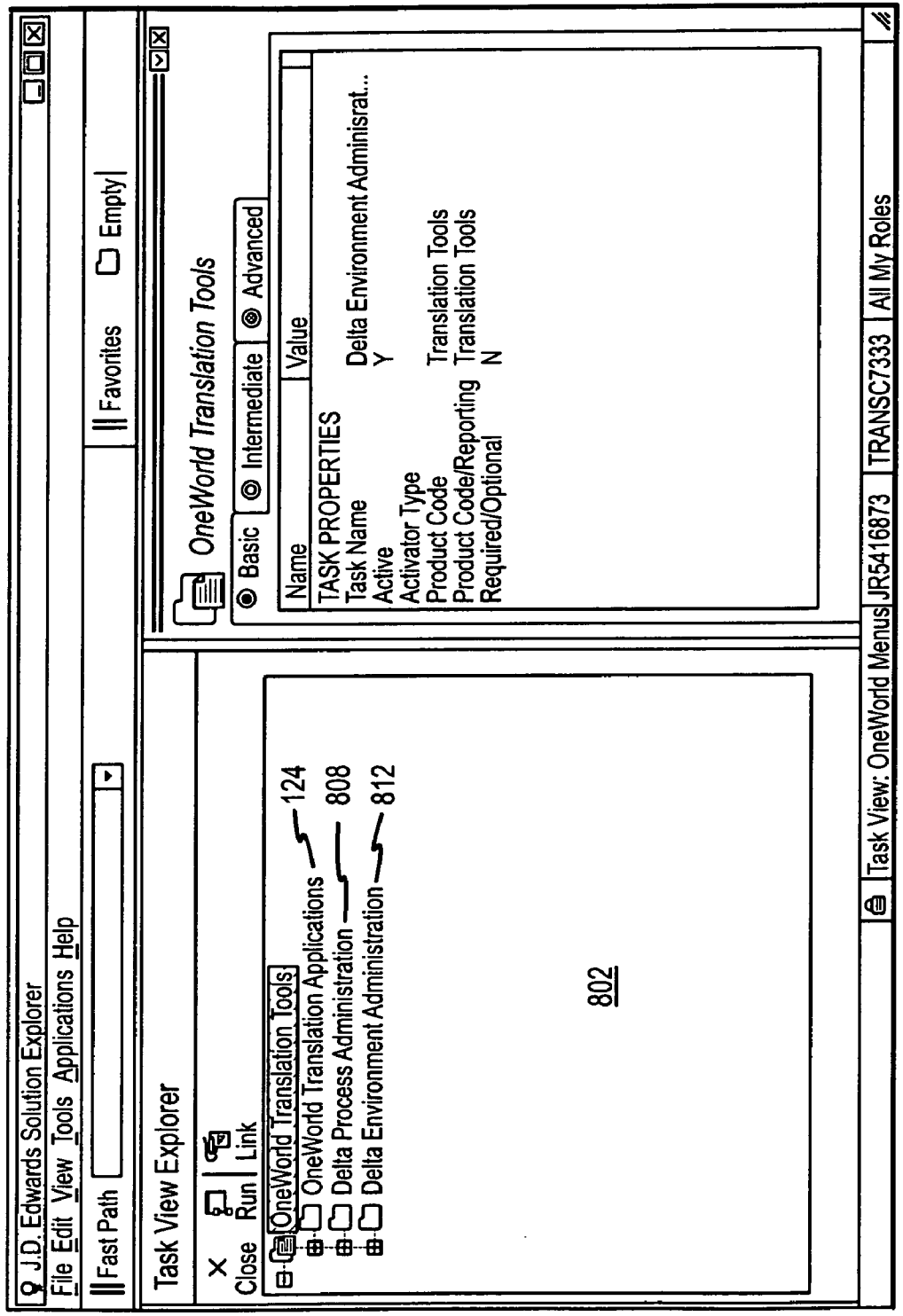

With reference now to FIG. 7, a flow chart illustrating the operation of a translation application 124 in accordance with an embodiment of the present invention is illustrated. Initially, at step 700, the translation application 124 is opened. Next, at step 704, the user or translator may select processing options. The translator may next select the type of text to work with, such as text from a particular source or form (step 708).

At step 712, the translator may use the translation application 124 to search within a selected text source type for records related to a selected target language and having a selected status. Accordingly, it should be appreciated that the translation tools application 124 may provide a front end interface that can be used by translators responsible for translating the source text into different natural languages. From the search results returned, the translator may select an individual record for translation, editing or review (step 716). Accordingly, it should be appreciated that the search performed at the direction of the translator may return results that include records that have already been translated for editing and/or review. Translation of the text, or edits to the text, or approval of a previous translation or suggested translation, may next be performed (step 720).

The translator can, at step 724, decide to reject the translation of the record, and flag the record for further review (step 728). Alternatively, the translator can accept the translation (step 724). In response to an indication that the translator has accepted the translation or after the record has been flagged for review, the translation application 124 updates the status table 416 for the relevant target language (step 732).

The translator may then choose to navigate to another record of the same selected type, status and target language (step 736) by selecting a next individual record (step 716). Alternatively, a search for records having a different target language and/or status may be performed (step 740) by performing a new search (step 712). As still a further alternative, the translator may select a different type of text to work with (step 744) by selecting a new text type (step 708). The translator may also exit the translation application 124 (step 748).

With reference now to FIGS. 8-38, the use of a translation tools system 122 and in particular the use of a translation application 124 in accordance with an embodiment of the present invention to perform example translation tasks is illustrated. Initially, after logging onto a computer (e.g., computer 108b in FIG. 1), the user may select the translation tools 122, in which case the user or translator is presented with a translation tools selection screen 800. From the translation tools selection screen 800, the translator may select from translation applications 124, delta or compare process administration 808, and delta or compare process environment administration 812.

Figure 9:
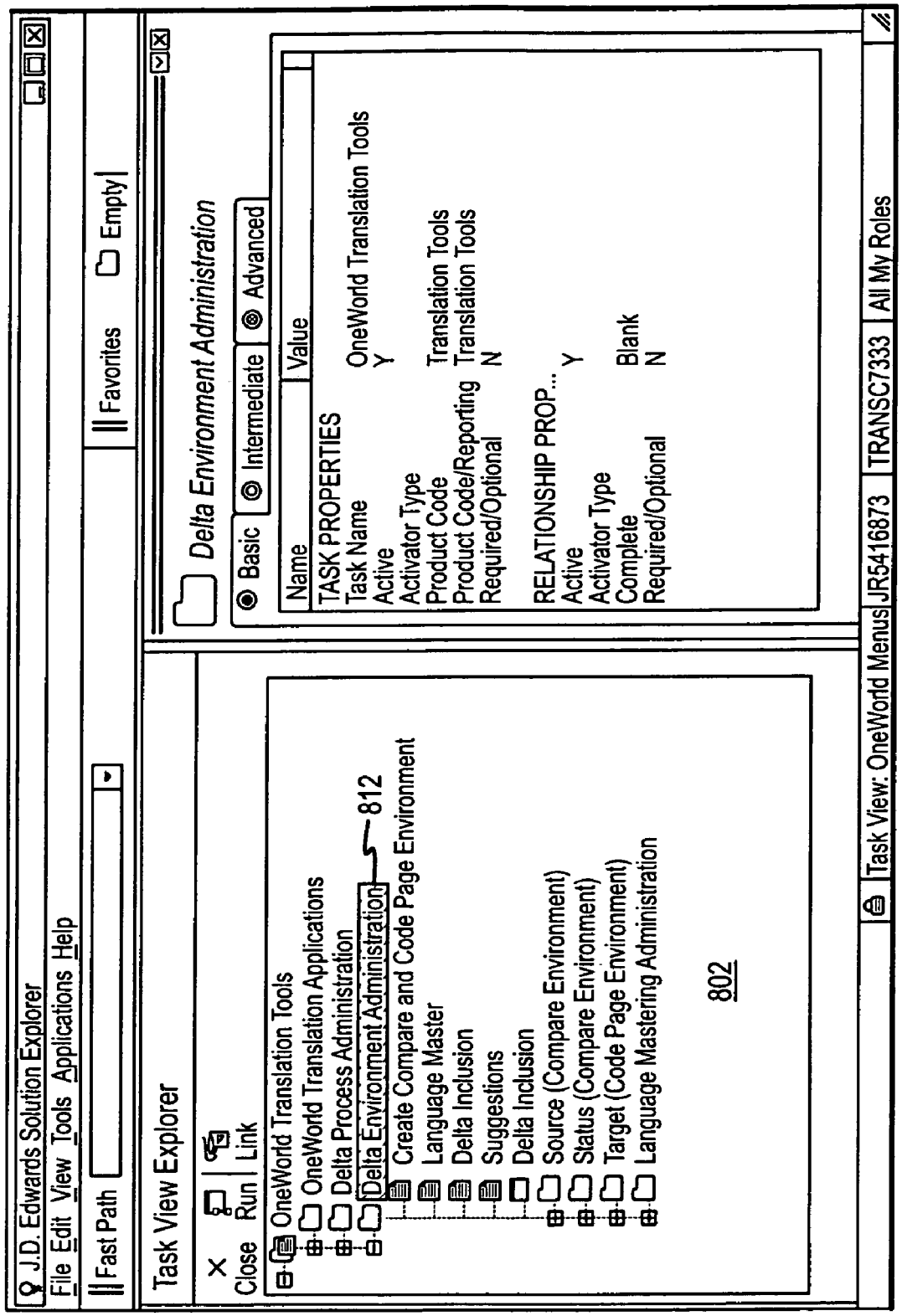

With reference now to FIG. 9, if the translator selects the delta environment administration item 812, various submenu items are displayed in the tree view window 802. In general, the submenu items that may be selected under the delta environment administration item 812 allow an administrator to configure various aspects of the environment in which the translation process and the development of target programs will proceed. For example, an administrator may use selections under the delta environment administration 812 item to configure the code pages 332-352 (see FIG. 3B) that will be used in connection with various target languages.

Figure 10:
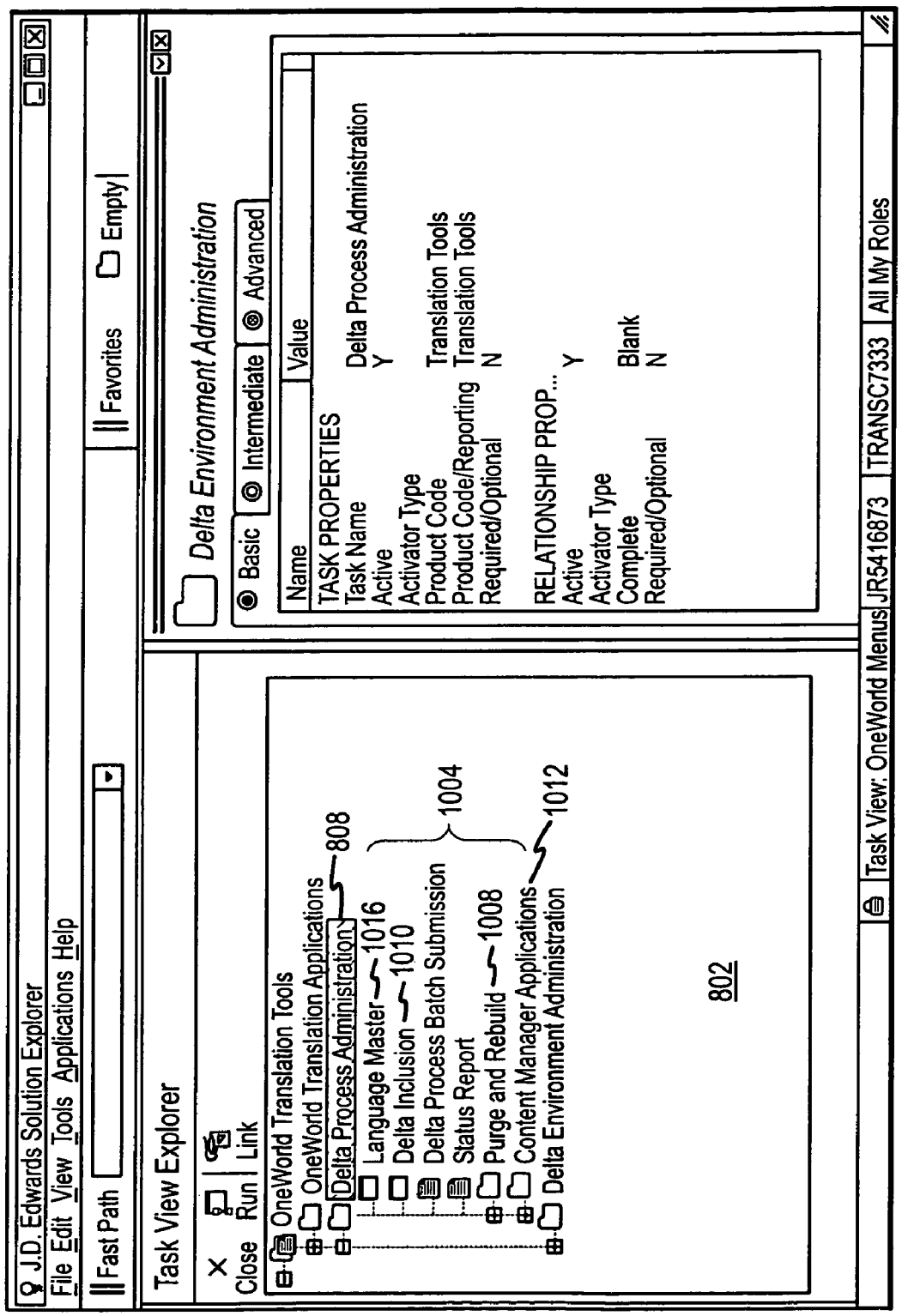

The delta process administration selection 808 includes submenu items that allow an administrator to control aspects of the delta or compare process (see FIG. 10). For instance, the delta process administration 808 item provides submenu selections 1004 to initiate the compare or delta process. In addition, a purge and rebuild program 1008 allows an administrator to remove invalid records and rebuild records that have been deleted inadvertently. A content manager application 1012 allows for changes in the source program to be tracked. This feature is useful in performing functions other than preparing translations of source text, such as preparing documentation related to the operation of the source computer program.

Figure 11:
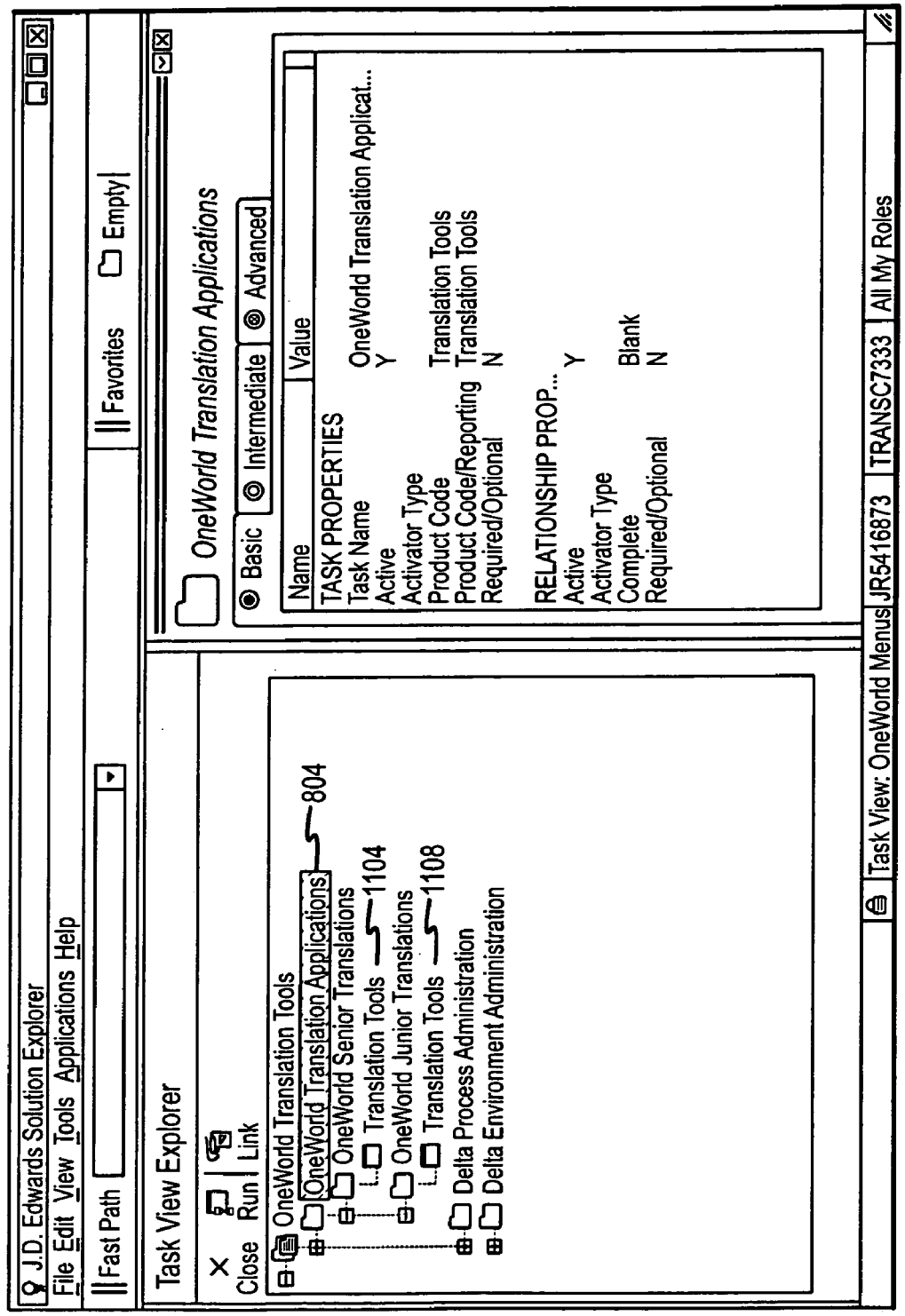

As shown in FIG. 11, the translation application 124 may be accessed by various categories of translators. For example, senior translators may utilize a first translation application 124a (item 1104), while junior translators may utilize a second translation application 124b (item 1108). In general, the differences between the translation application 124a utilized by senior translators, and the translation application 124b utilized by junior translators includes the actions that may be taken with respect to a record. Furthermore, it should be appreciated that the translation applications 124a-b accessed through the different menu items 1104, 1108 may be identical, except that certain options may have different default values. The particular translation application 124 utilized by a translator may result in records being assigned different statuses. For instance, a record may be assigned a "review" status after a translation of source text has been entered by a junior translator, indicating that the translation should be reviewed by a more senior translator. A record may be assigned a "complete" status after it has been translated by a senior translator, or after a previously completed translation has been reviewed by the senior translator. The status assigned to a record after review may, according to an embodiment of the present invention, be entered in the relevant status table 416 automatically, after the translator has selected a next record for review. Accordingly, the present invention assists translators in efficiently performing their duties.

Figure 12:
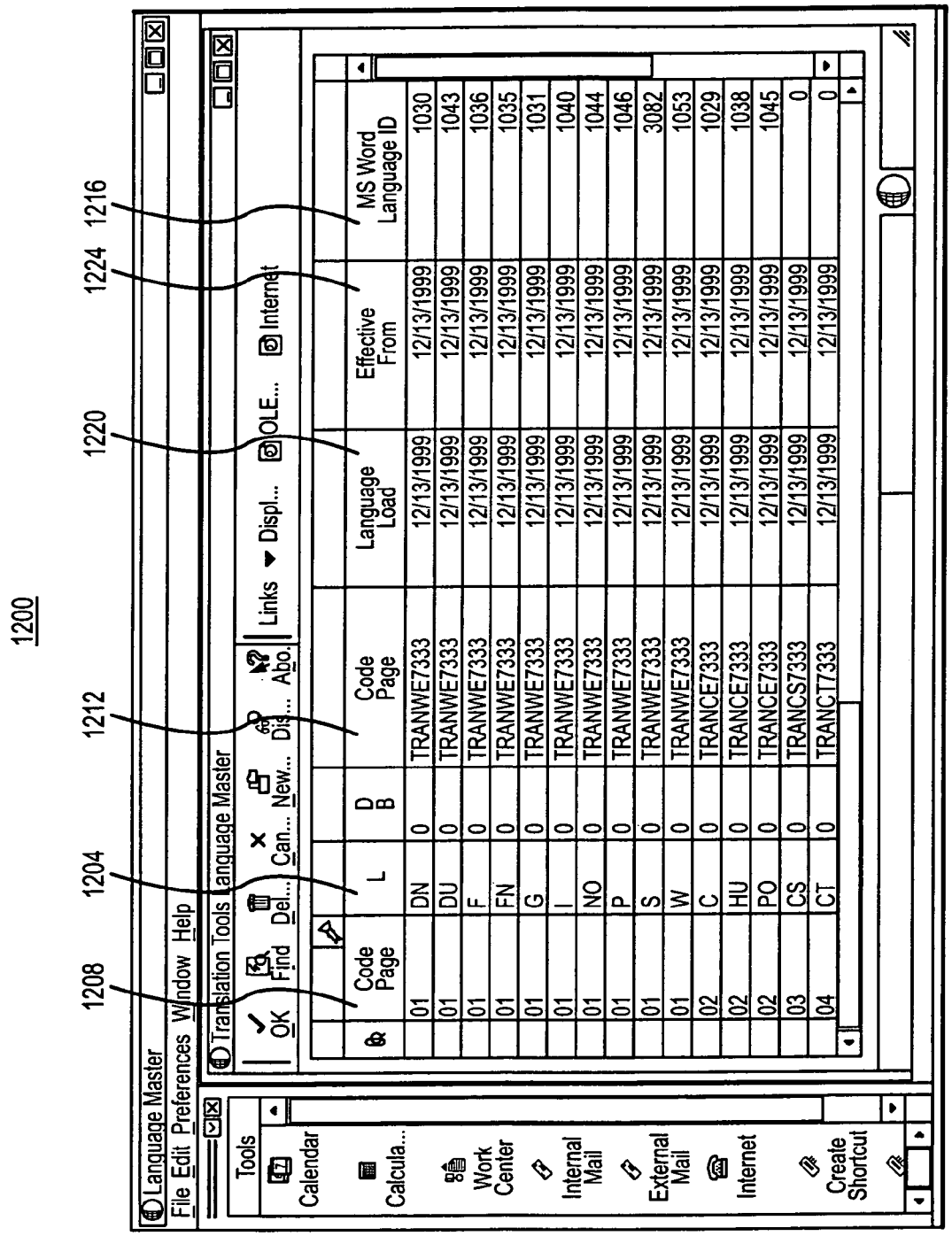

With reference now to FIG. 12, a translation application language master screen 1200 is illustrated. The language master screen 120 may be selected from a submenu item 1016 (see FIG. 10) under the delta or compare process administration item 808 in the translation tools screen 800. The language master screen 1200 includes a language column 1204 containing a target language code for each target language that the source computer program is being translated into. A code page column 1208 indicates the code page 332-352 associated with the language 1204. A second code page column 1212 includes links that allow the administrator to connect to a code page from the language master screen 1200. An MS Word language I.D. column 1216 contains the language code for each of the languages 1204. By associating the MS Word language I.D. 1216 with the target language 1204, the translation application 124 may provide spell check functionality in the target language 1204 to assist translators in preparing accurate translations. This spell check functionality in the target language may be provided even though the translation application 124 is written in the source language. In addition, language load 1220 and effective from 1224 columns are provided to assist the administrator in determining when the code page environments were established.

With reference now to FIG. 13, a work with delta table inclusions page 1300 is illustrated. The work with delta inclusion page 1300 may be selected from a submenu item 1010 under the delta process administration 808 menu heading (see FIG. 10). In general, the work with delta table inclusions page 1300 allows an administrator to confirm that the compare process is proceeding as expected. In a description column 1304, descriptions of different sources of natural language text included in a source computer program are listed. The associated delta table code 1308 for each of the sources in the description column 1304 is also shown. The include table column 1312 allows the administrator to determine which of the sources of natural language text are included in a particular compare process. The selective inclusion of tables in which natural language text may be found is useful in limiting the amount of resources required to run the compare process. In addition, the version column 1316 allows compare process tasks to be assigned to different computers 104, 108 to allow for the efficient allocation of those computing tasks.

The status description column 1320 includes an indication of whether the compare process was successful with respect to each of the tables for which the compare process was run. A total records column 1324 displays the total number of records from a given source 1304, and a change records column 1328 indicates the number of those records included in the total records that have been changed since the last compare process was run.

Figure 14:
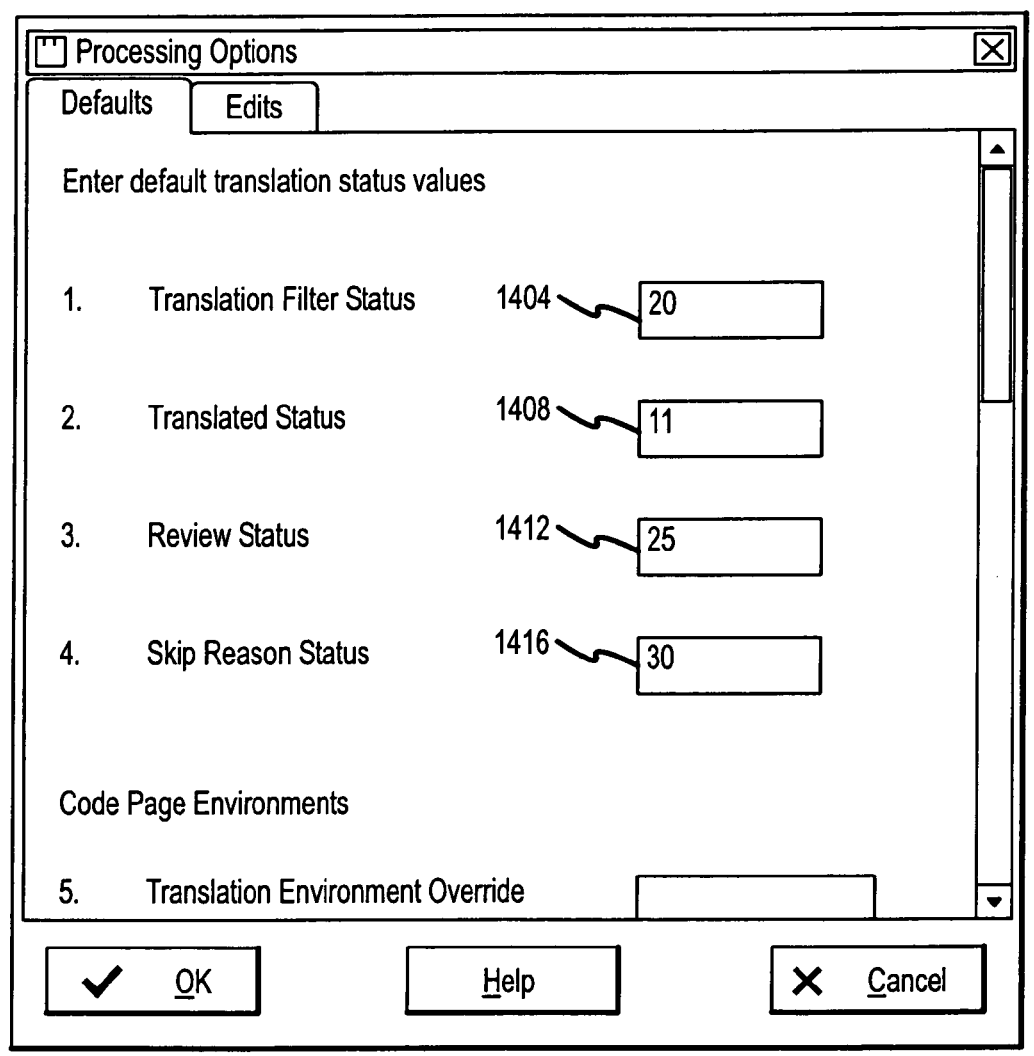

With reference now to FIG. 14, a processing options window 1400 is illustrated. The processing options window 1400 allows various options to be selected for automating the translation process. For example, a translation filter status 1404 may be entered so that only those records having the selected status are returned to the translator associated with the processing options 1400. A translated status selection 1408 allows the administrator to determine what status is entered with respect to a record after that translator has reviewed or edited a record containing natural language text. The review status 1412 selects the status that is associated with a record after the translator has reviewed the record, but not altered the translated text of the record. A skip reason status 1416 is the status that is associated with a record after a translator has skipped a particular window without translating the text associated with the record. Accordingly, it can be appreciated that the processing options are selected prior to performing translations in connection with the translation application 124. In addition, it can be appreciated that separate processing options may be maintained and determined by the administrator.

Figure 15:
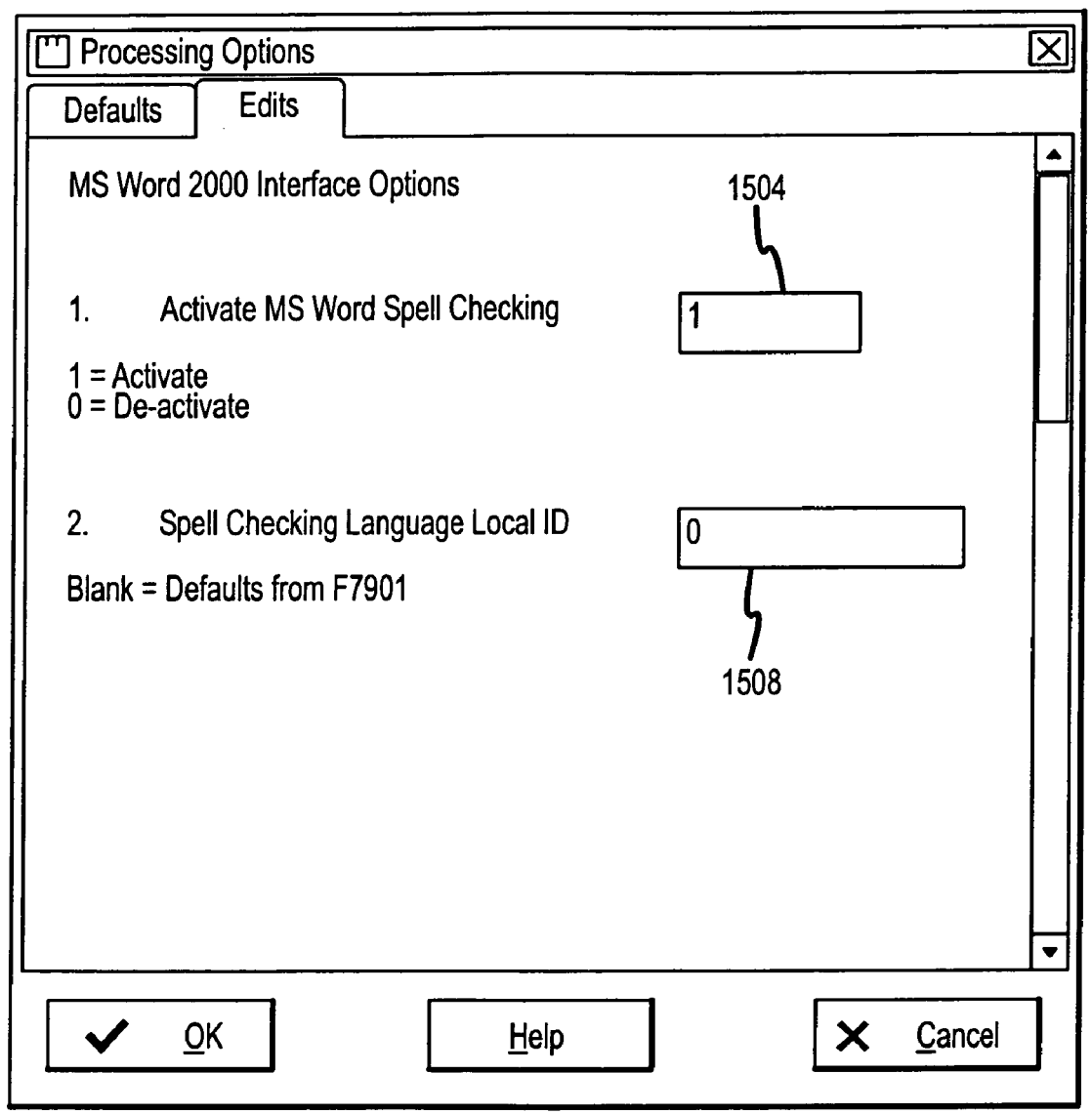

With reference now to FIG. 15, a processing options window 1500 is illustrated. The processing options are associated with each application, and allow the administrator to select aspects of the operation of the translation application 124 that will apply when the translator is utilizing the translation application 124. Accordingly, the translator may use the processing options window 1500 to select whether MS Word spell checking is activated by entering the appropriate code in a window 1504, and to select the local spell checking language in a window 1508.

Figure 16:
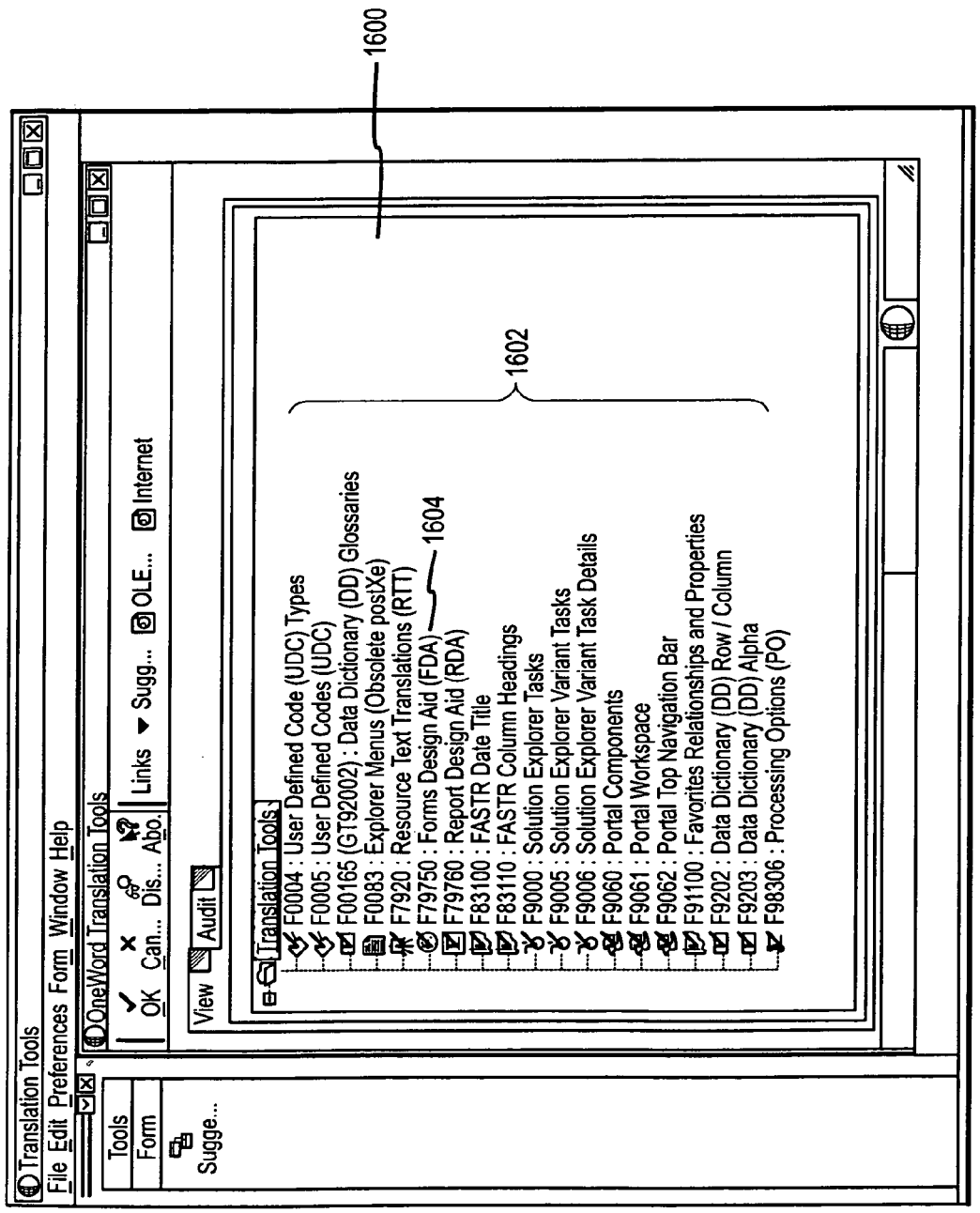

With reference now to FIG. 16, a translation tools view window 1600 illustrating various sources 1602 of natural language text records associated with a source computer program is illustrated. As can be appreciated, the sources listed in the translation tools window will vary depending on the particular application or set of applications (i.e., system) that comprises the computer program being translated. In order to begin translation, a translator may select one of the sources.

Figure 17:
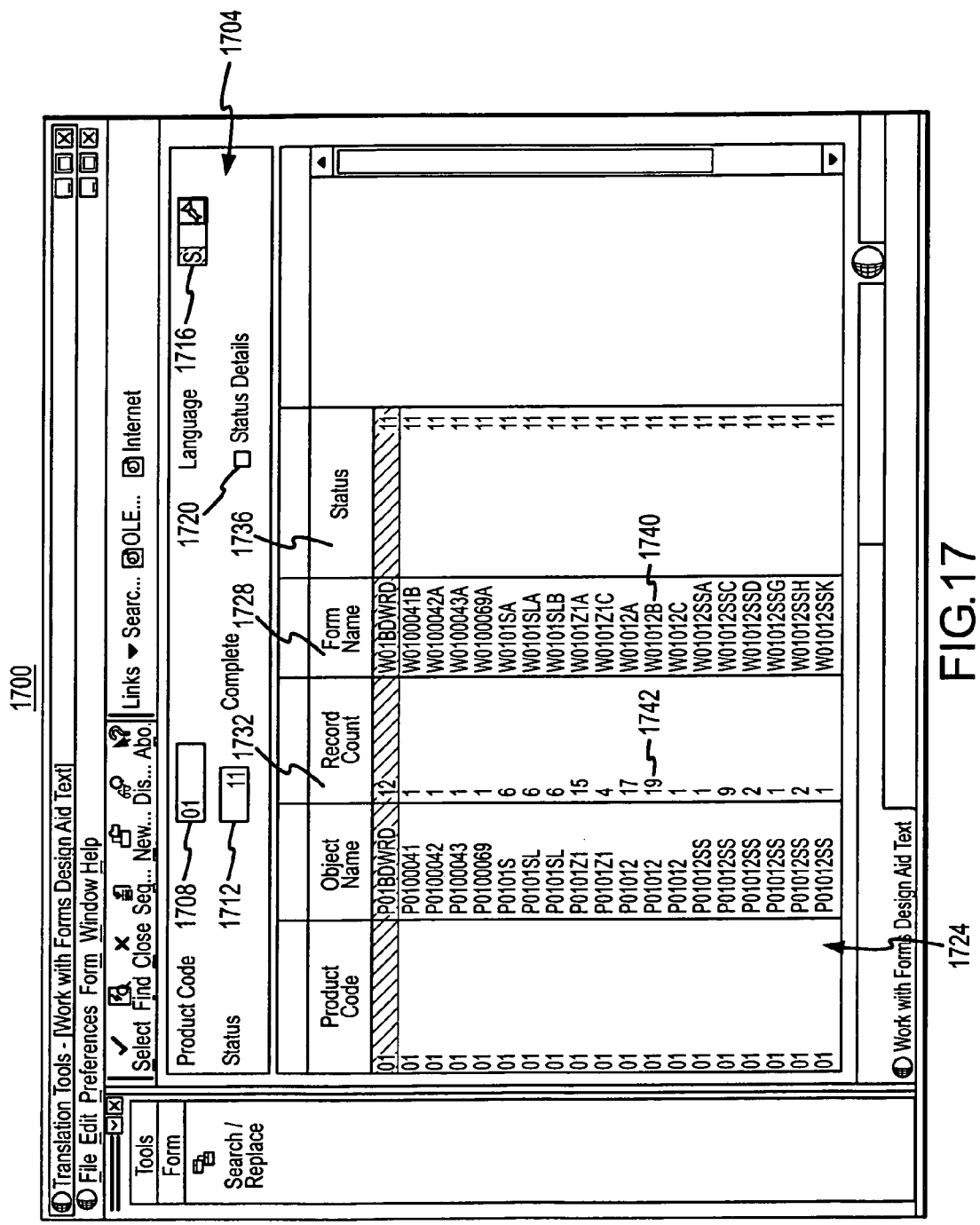

In FIG. 17, an example of a screen displayed to a user after selecting a particular source of natural language text records is illustrated. In the present example, the Forms Design Aid item 1604 (see FIG. 16) was selected, and thus a work with forms design aid text window 1700 is presented to the translator. In general, the "work with text" window 1700 provides a front end to search capabilities provided by the translation application 124. In particular, a number of search criteria 1704 may be specified by a translator. These search criteria 1704 may include the product code 1708, for specifying the particular source computer program in connection with which records containing text for translation will be performed. In general, selection of a source of text in the translation tools window 1600 (see FIG. 16) results in a "work with" window being presented to the translator. A status window 1712 is provided to allow the translator to specify a search for records having a particular status. In the example window 1700 shown in FIG. 17, the entered status 11 is a "complete" status defaulted from the processing options 1400 (see FIG. 14). Accordingly, the returned records from this example search will all have a status of "complete". A language window 1716 defaulted from user profile setup allows the translator to search for records with reference to a particular target natural language. Accordingly, records returned from the search will be related a translation of the source computer program into the specified target language. In the example shown in FIG. 17, the target natural language is Spanish, specified by the code letter "S". A status details check box 1720 is provided to allow the translator to have a list of individual records returned as a result of the search. The search results window 1724 contains information regarding the results of the search.

In the example of FIG. 17, the status details box 1720 has not been checked. Accordingly, the search results are organized according to the form name 1728 with which individual records are associated. A record count column 1732 lists the number of individual records associated with each form. The status column 1736 shows the status of the records returned in connection with the search. Here, because the search criteria for a status 1712 was specified as "complete" using code 11, all of the records found as a result of the search have a status of 11. Similarly, all of the returned records are related to product code 01 1724, as product code 01 was specified as part of the search criteria 1708. If the translator had checked the status details box 1720, information related to each individual record complying with the search criteria 1704 would be listed, rather than having the records grouped according to their form name 1728.

Figure 18:
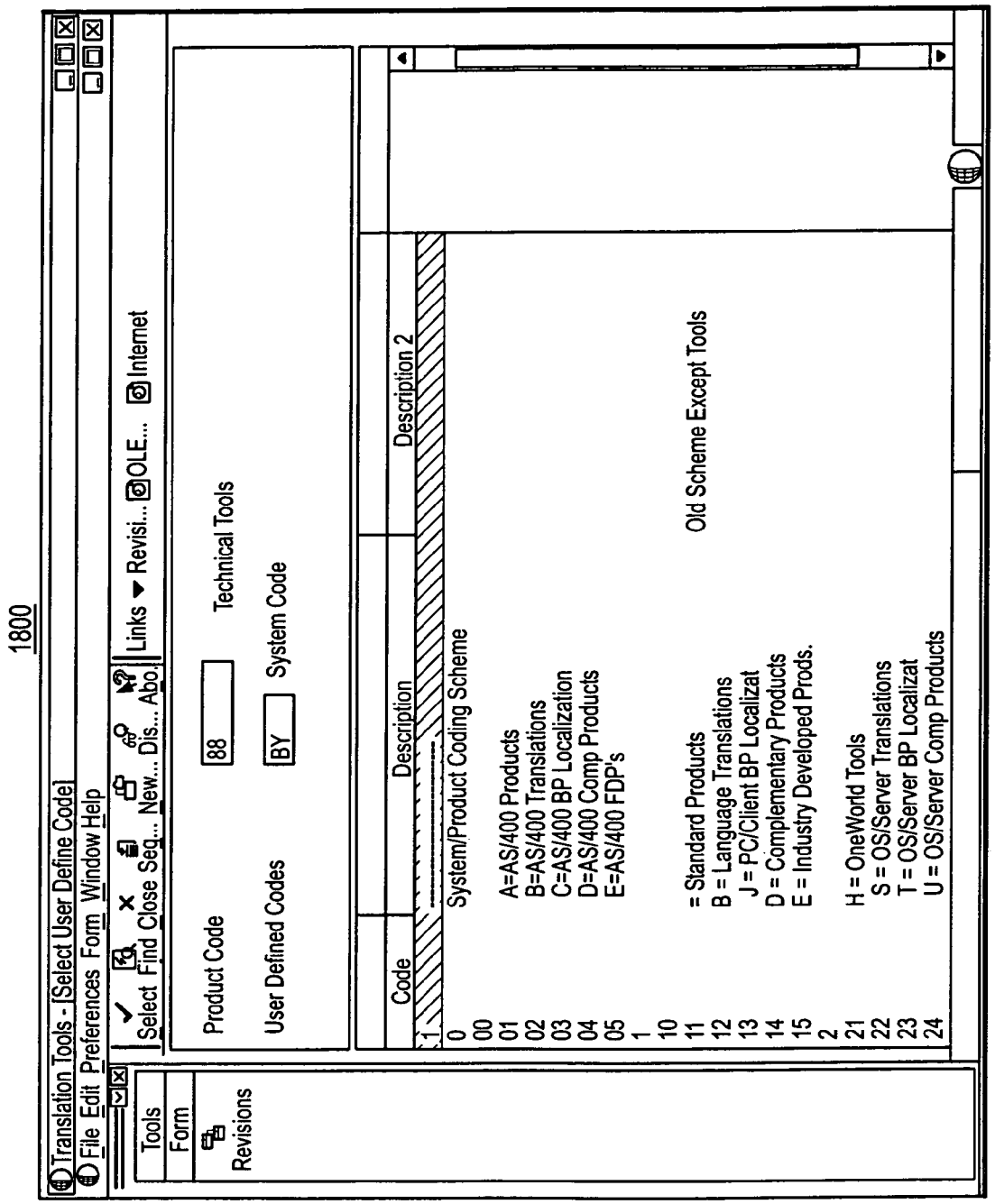

With reference now to FIG. 18, a select user define code window 1800 is illustrated. The select user define code window 1800 is displayed to the translator following selection of the user defined codes item 1708 from the translation tools window 1700 (see FIG. 17). The select user define code window 1800 allows the translator to view assigned codes. Accordingly, the select user define code window 1800 provides the translator with an explanation of what various numeric codes signify in the source computer program 304.

Figure 19:
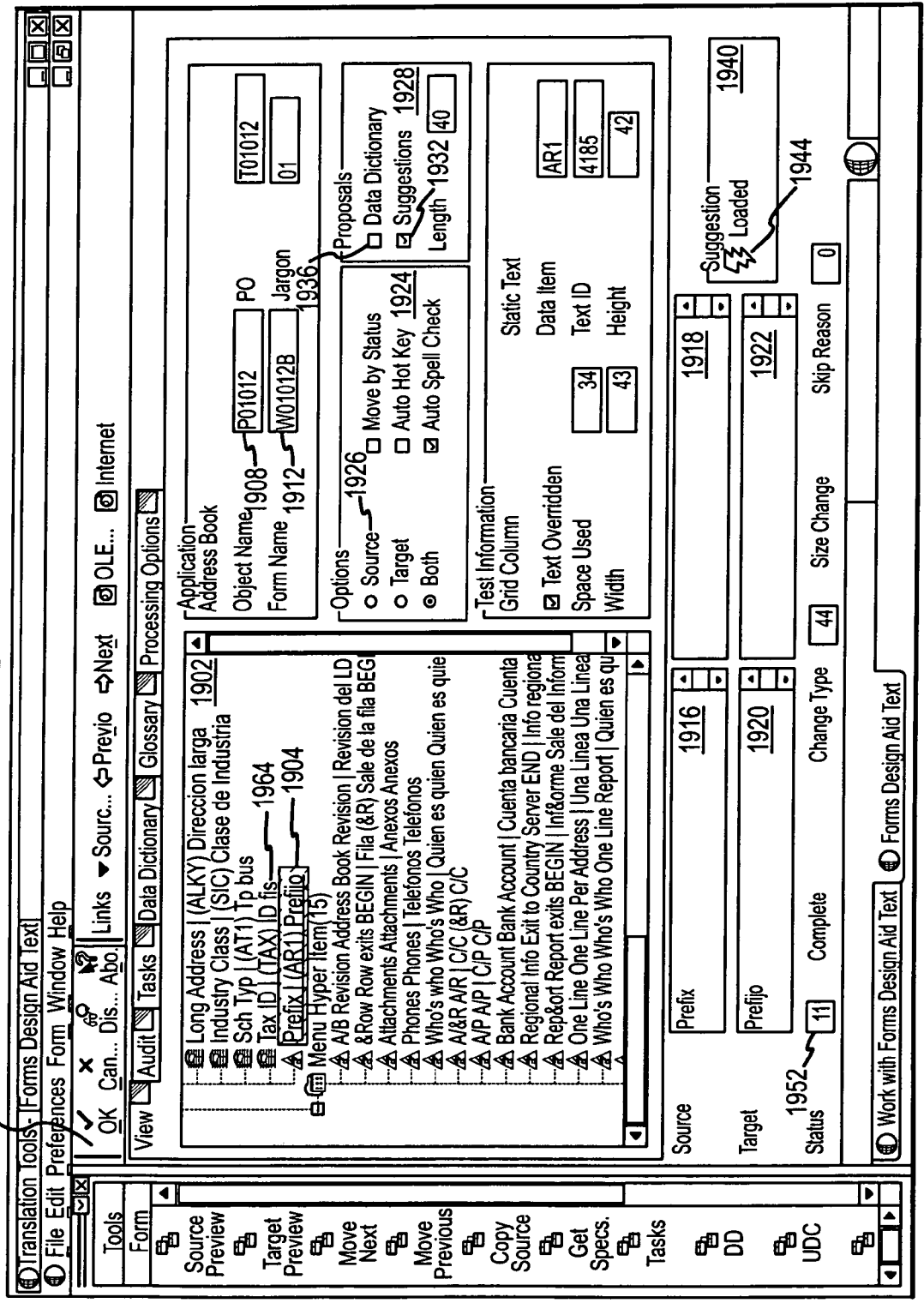

FIG. 19 illustrates a record view window 1900 in accordance with an embodiment of the present invention. The record view window 1900 allows a user to select particular records for translation. In the example window 1900 shown in FIG. 19, and in particular in the record tree display window 1902, records from form name W01012B are displayed. According to the present example, this form could have been selected from the listing for that form 1740 in the "work with text" screen 1700. In the example record view window 1900 of FIG. 19, an individual record containing the natural language text word "prefix" in the source computer program is highlighted 1904. On the right side of the bar in the highlighted item 1904, the code "AR1" is displayed in parentheses together with a translation of the natural language text into the target language (Spanish in the present example), "Prefijo". The highlighted natural text record 1904 is part of a larger group of records that belong to object name P01012, as shown in the object name text box 1908. In addition, the displayed records are from form WO1012B, as shown in form name box 1912.

In addition to displaying the natural language text contained in the selected record in the record tree display window 1902, a first source text edit box 1916, a second source text edit box 1918, a first target text edit box 1920, and a second target text edit box 1922 are provided. In the record view window 1900, the source text edit box 1916 is disabled, to prevent a translator from altering the source text. The target text edit box 1920 allows the translator to enter a translation of the source text. Alternatively, the translator may use the target text edit box 1920 to edit a previous translation of the source text. The translator is assisted in preparing an accurate translation of the source text by the code displayed with the record 1904. In the present example, the highlighted record 1904 includes the code "AR1". This indicates to the translator that the term prefix relates to accounts receivable. By providing the translator with information regarding the context in which the natural language text is used, the translator is assisted in preparing an accurate translation of the source text.

The translation application 124 also provides automated features to assist the translator in rapidly preparing translated text. For example, an options area 1924 includes various check boxes to allow the translator to make selections regarding navigation, and to selectively enable spell checking of the source text, the target text, or both the source and the target text. All tree views such as 1902 can be displayed with Source, Target or Both types of language text 1926 by making the appropriate selection in the options area 1924. A proposals area 1928 allows the translator to select whether automated proposals for translations of source text are provided. In the present example, the suggestions check box 1932 is selected. Accordingly, the translator will be provided with a proposed translation if a table of suggestions included as part of the translation application 124 includes a translation of text matching source text displayed in the edit boxes 1916, 1918. The translator may also select the data dictionary check box 1936, in which case a translation of terms included in the data dictionary will be returned, if an appropriate entry in the data dictionary is available. Where a translation is available in both the suggestions and the data dictionary areas, and the translator has enabled proposals from both sources, the data dictionary entry will be provided over the suggested entry.

In the example of FIG. 19, a status area 1940 displays an icon "suggestion loaded" 1944 to signify that a target edit box 1920, 1922 contains text that was obtained from the suggestion table. Accordingly, if the translator agrees that the text displayed in the target edit box 1920, 1922 is an accurate translation of the source text displayed in the source text edit box 1916, 1918 the translation can be completed by clicking the "OK" button 1948. A status window 1952 is provided to allow the translator to assign a selected status for the record associated with this translation. In the present example, the status code "11", signifying that the translation is complete, has been automatically loaded as a result of the entries that were made in the processing options window 1400 (see FIG. 14) with respect to the translator logged into the translation application 124.

The second source text edit box 1918, and the second target text edit box 1922 are provided to display text that is divided into two parts. As an example, the "TAX I.D." record 1964 might display the word "Tax" in the first source text edit box 1916 and the word "I.D." in the second source text edit box 1918. The translator would then enter a translation for the term "Tax" in the first target text edit box 1920, and a translation of the term "I.D." in the second target text edit box 1922.

Figure 20:
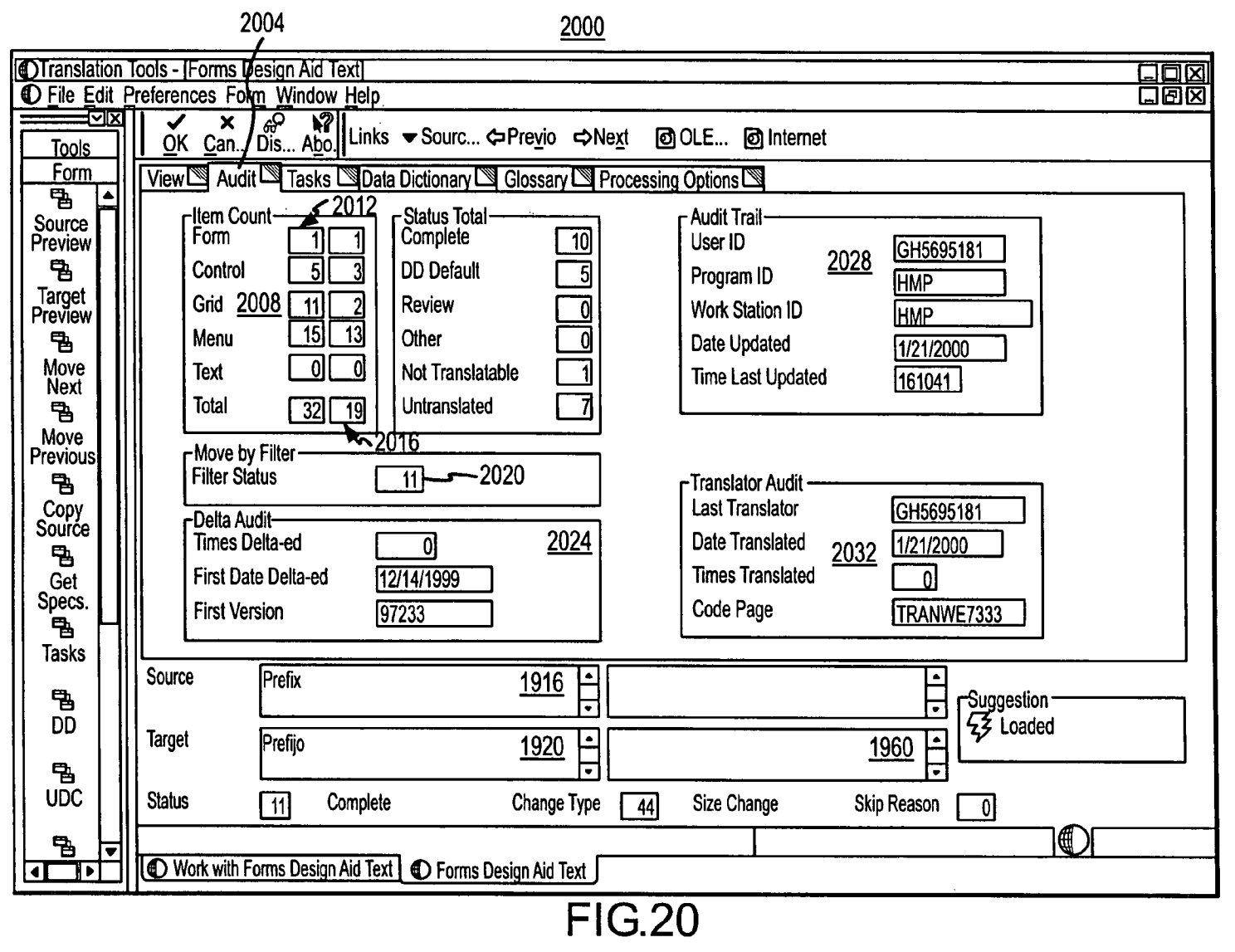

With reference now to FIG. 20, a forms design aid audit window 2000 is illustrated. The forms design audit window 2000 may be accessed by clicking the audit tab 2004, for example from the forms description record view window 1900. In general, the audit window 2004 displays information related to the overall status of a translation into a target language. Accordingly, in the item count area 2008 a first column of numbers provides information regarding records included as part of a particular form. The form with respect to which this information is provided is the active form, selected from the work with forms design aid text window 1700 (see FIG. 17). In the present example, the selected form continues to be Form WO1012B 1740. Thus, from the item count area 2008, it is apparent that the selected form 1740 contains one form having various other components. The first column 2012 in the item count area 2008 displays the total number of item types within the selected form. In the present example, the selected form comprises a total of 32 items. The second column 2016 displays the number of items enumerated in the first column 2012 that have a selected status. The currently selected status displayed in the filter status box 2020. In the present example, the currently selected status 2020 is 11, signifying "complete" in the present example. Nineteen items are shown in the second column 2016 as being "complete". The active status is selected in the status box 1712 included as part of the search criteria 1704 accessible from the work with forms design aid text window 1700 (see FIG. 17). The current record count 1732 reflects the number of records in each form matching the search criteria 1704. For example, for Form WO1012B 1740 there are 19 records 1742 matching the search criteria 1704.

Various information related to the record being edited, the text of which continues to be displayed in the source text edit box 1916, 1918 together with any translation of the source text in the target text edit boxes 1920, 1922 is displayed by the design aid audit window 2000. In particular, the delta audit area 2024 contains information regarding compare processes run with respect to the active target record. An audit trail area 2028 displays information regarding the last translator to work on the active target record. The translator audit area 2032 displays information regarding the last translator to enter a translation of the active target record and the date of that translation, the times that a translation has been entered with respect to the source record into the relevant target language, and the code page on which the target record is stored.

Figure 21:
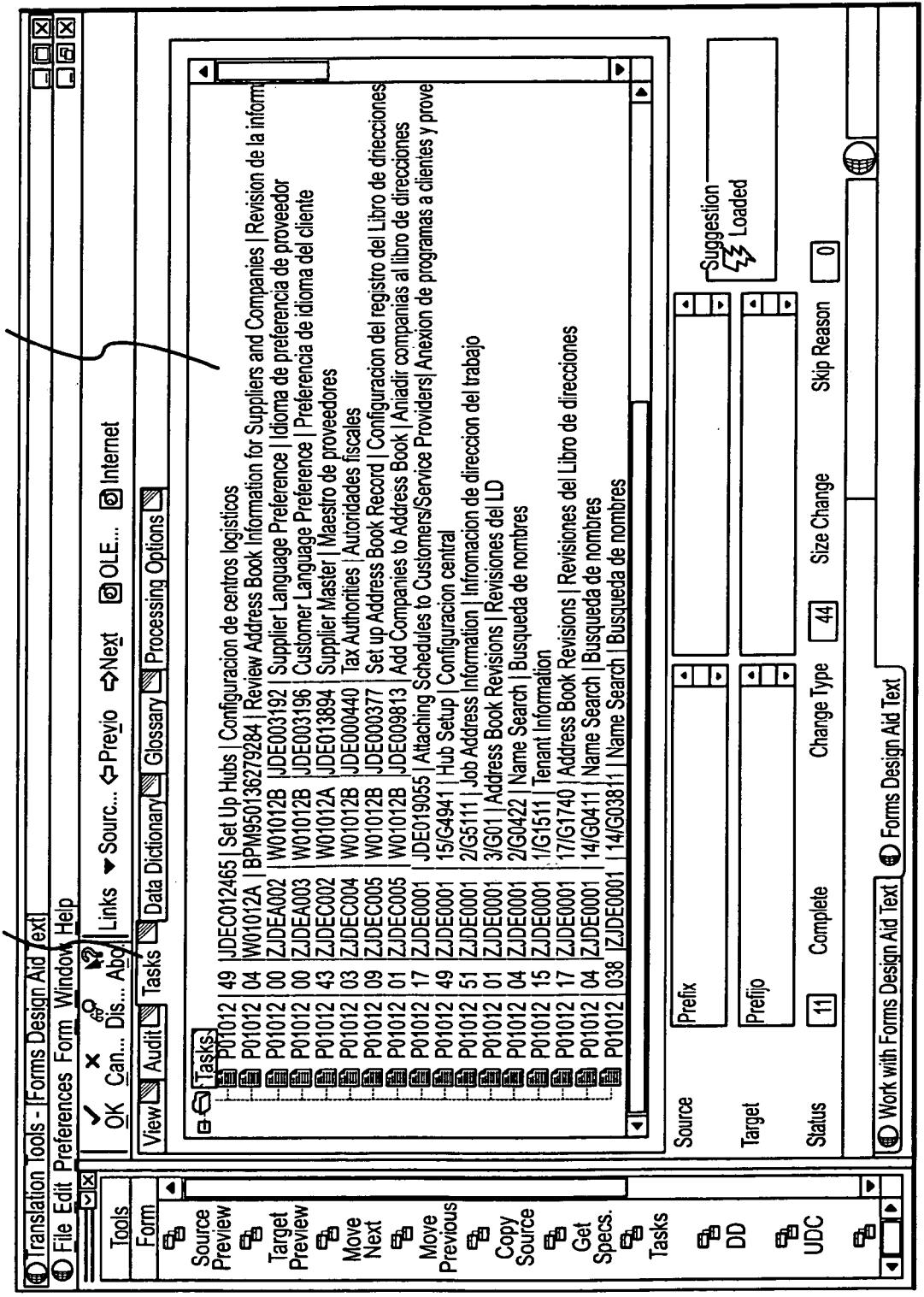

As shown in FIG. 21, the activation of the tasks tab 2100 displays a forms design aid text tasks window 2104. The tasks window 2104 is useful in performing quality assurance of the translation. In particular, source text records are shown with any translation of those records into the target language. In addition, information regarding the particular application within the source computer program that each natural text record is associated with, and the system or systems that use that application, are displayed.

Figure 22:
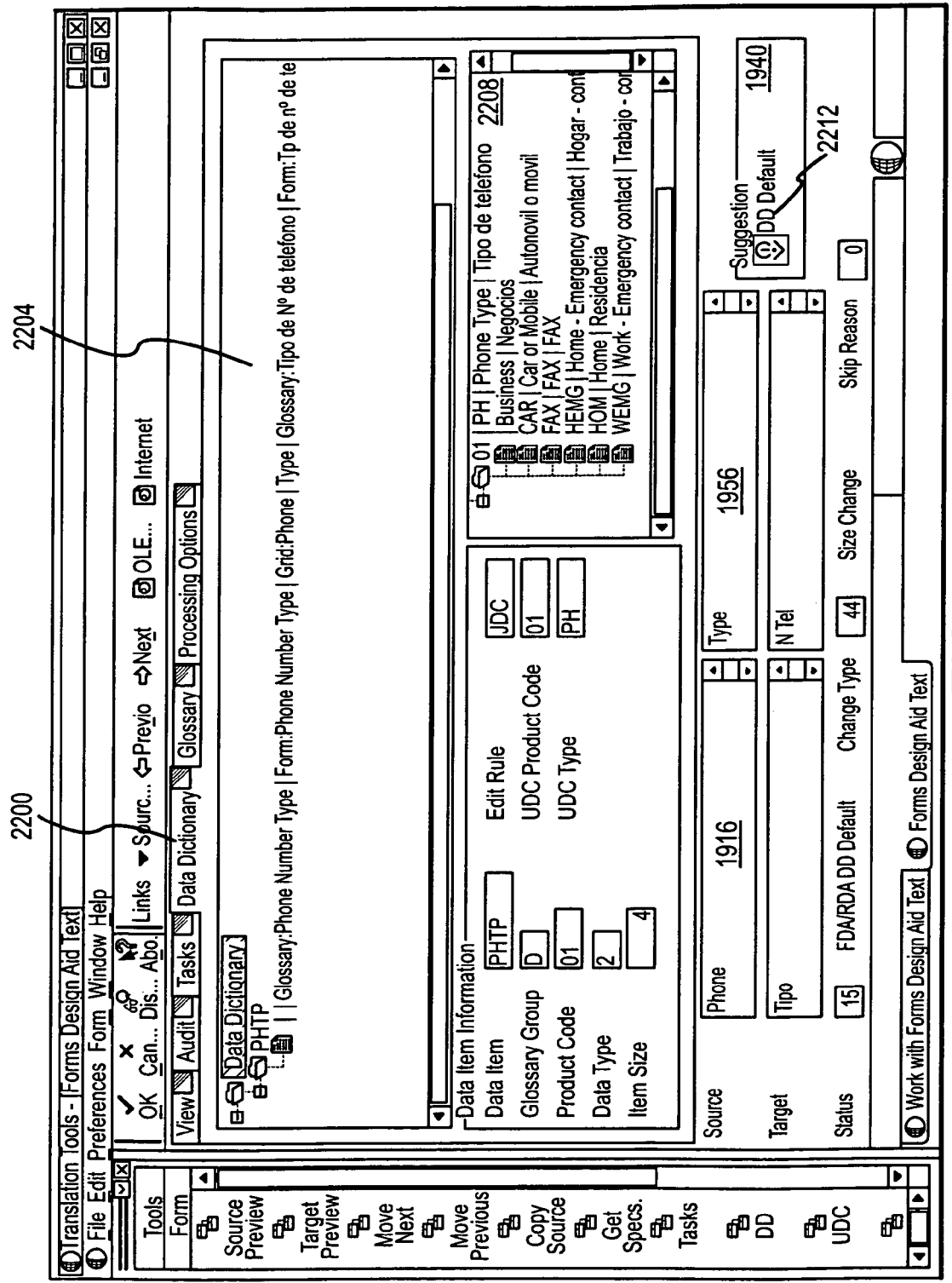

As shown in FIG. 22, selection of the data dictionary tab 2200 provides a display of a data dictionary window 2204. The data dictionary window 2204 allows a user to access particular data dictionary items. In the present example, the source text, shown in the source text edit boxes 1916, 1918 is "phone type". Accordingly, the display in the data dictionary window 2204 displays information regarding where the terms "phone" and "type" appear in connection with a computer program. In addition, a usage display window 2208 shows where the exact term "phone type" is used. In the present example, the data dictionary tree 2204 can be displayed by selecting the data dictionary tab 2200. Alternatively, where a suggested translation has been provided and the data dictionary default icon 2212 is displayed in the suggestion area 1940, the data dictionary default icon 2212 may be selected to display the data dictionary window 2900 (see FIG. 29).

Figure 23:
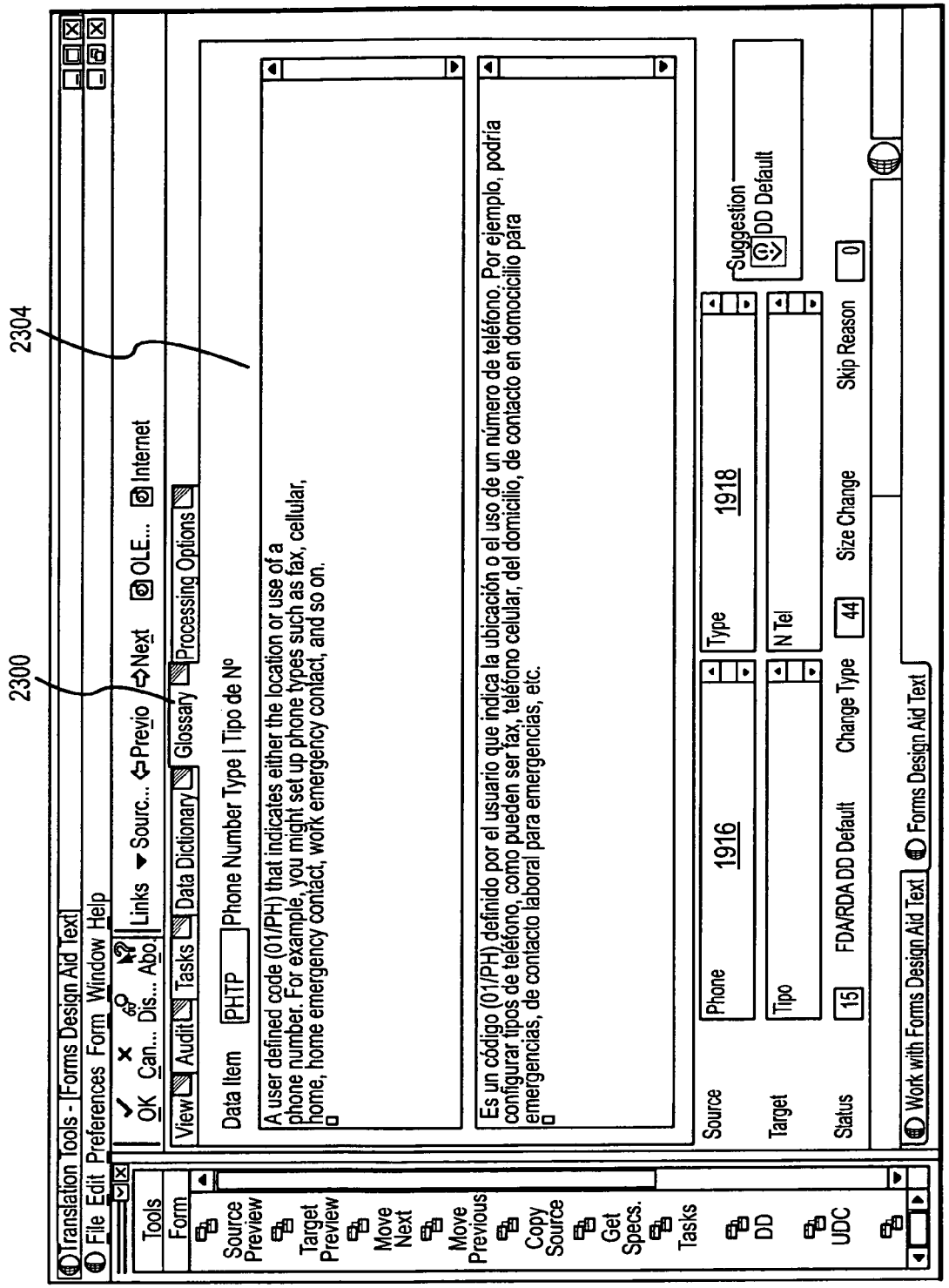

As shown in FIG. 23, a selection of the glossary tab 2300 provides the user with a glossary window 2304. The glossary window 2304 displays any glossary entry related to the selected text (i.e., the text displayed in the source text edit boxes 1916, 1918). The glossary entry may be provided in both the source language, and the target language. The glossary entry is useful in assisting a translator in preparing an accurate translation of the selected natural language text record.

Figure 24:
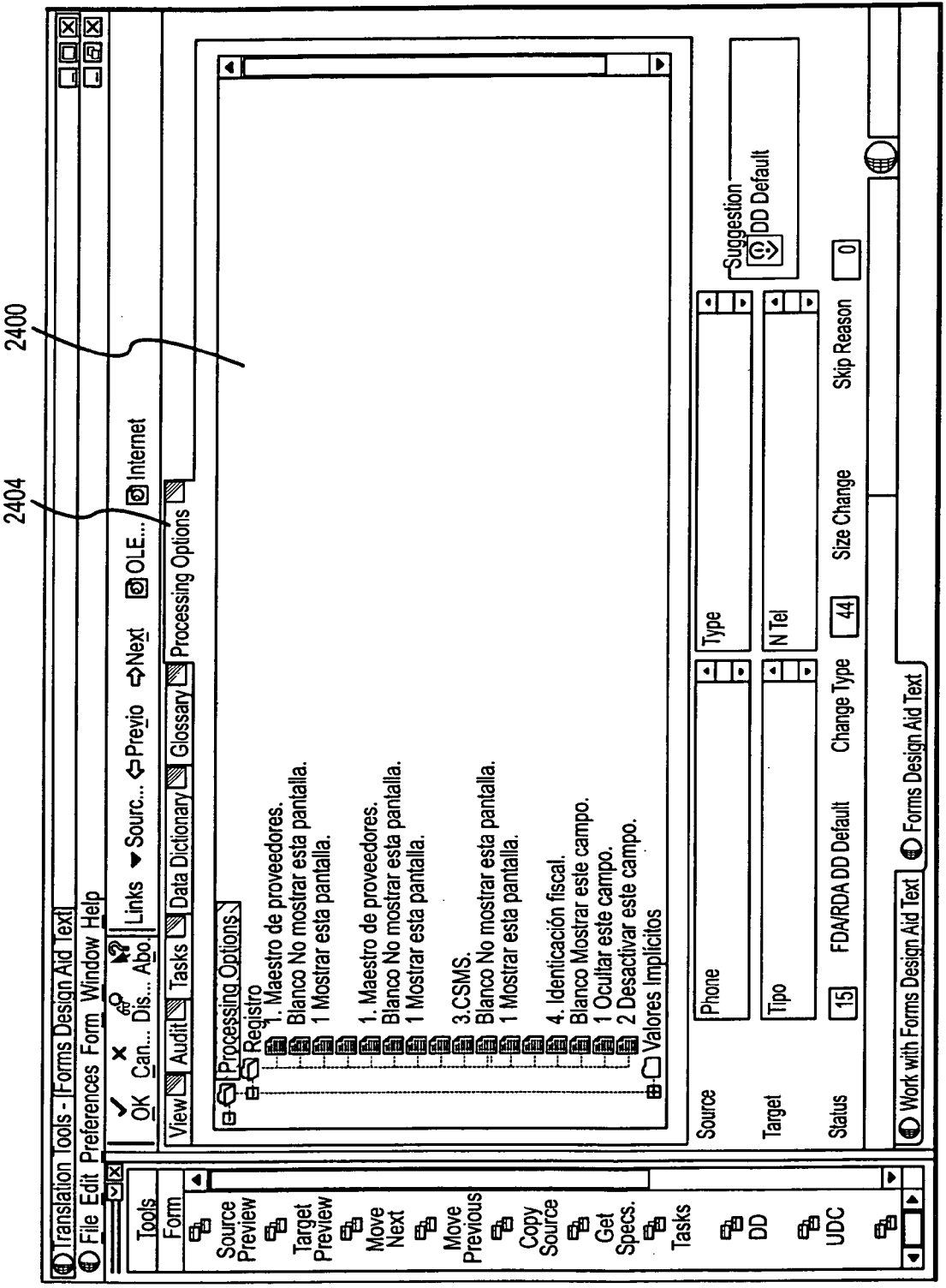

With reference now to FIG. 24, a processing options window 2400 is illustrated. The processing options window may be displayed by selecting the processing options tab 2404. In general, the processing options window 2400 contains text related to a selected application that has been translated into the target language. Accordingly, the processing options window 2400 assists translators and other users in ensuring that an application is completely translated.

Figure 25:
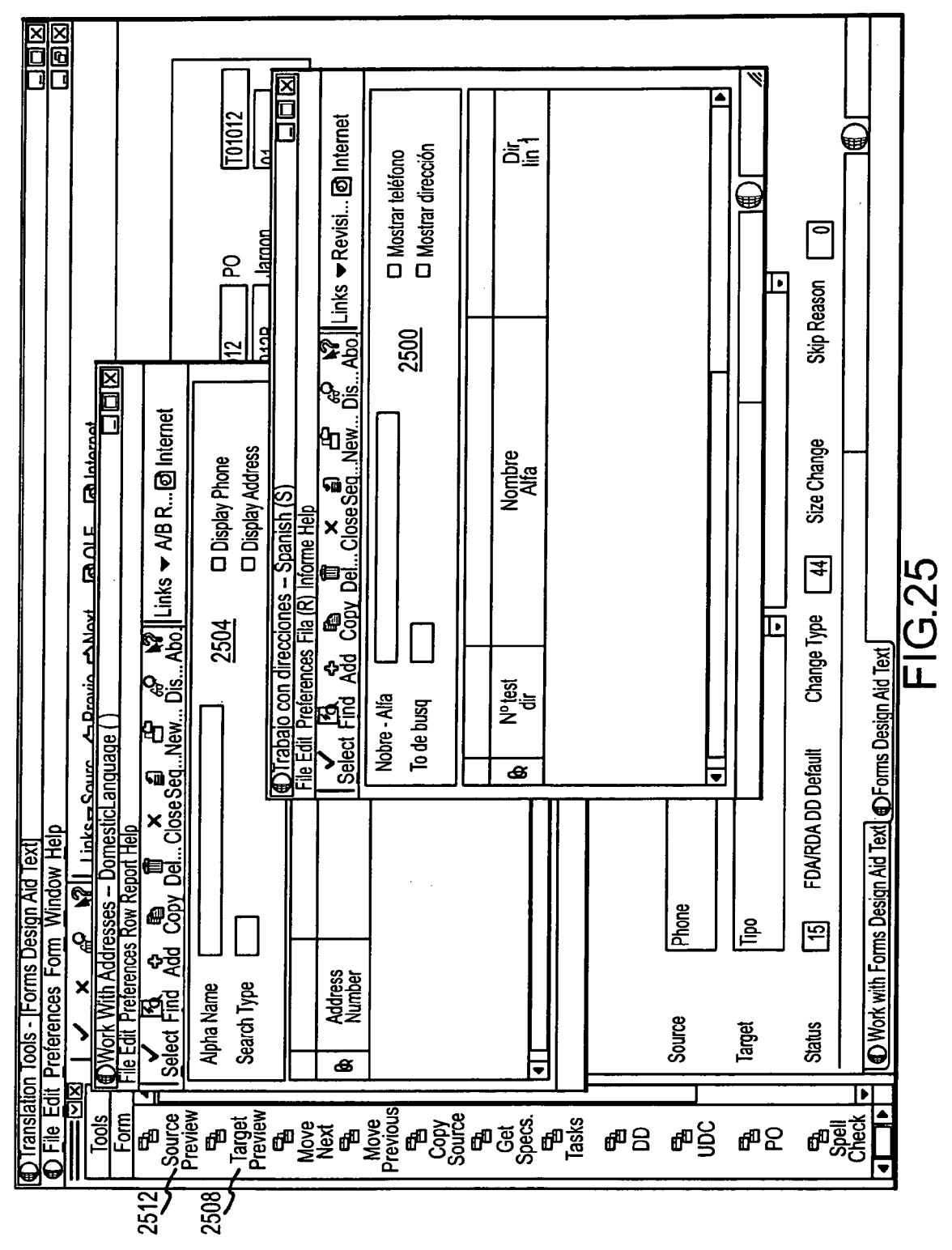

As shown in FIG. 25, the translation application 124 allows a user to view both source text and translated text in the context in which such text will appear in the finalized computer program. In particular, a target preview window 2500 is provided for displaying a screen of the computer program in which the text of the selected record will appear in the version of the computer program that has been translated into the target language. Alternatively or in addition, a source preview window 2504 may be displayed that contains the text of the selected record in the context of its usage in the source computer program. The target text window 2500 may be displayed by selecting the target preview button 2508, and the source language window 2504 may be displayed by selecting the source preview button 2512. By providing such in-context views of source text and translated text, the translation tools 124 assist translators in preparing accurate translations of text from a source language into a target language.

In addition, the in-context view capability illustrated in FIG. 25 is dynamic. Accordingly, if a translator, for example, edits a previous translation of a term, and then selects the target preview while the relevant record is selected, the target application window 2500 displayed will incorporate the most recent edit of the translation.

Figure 26:
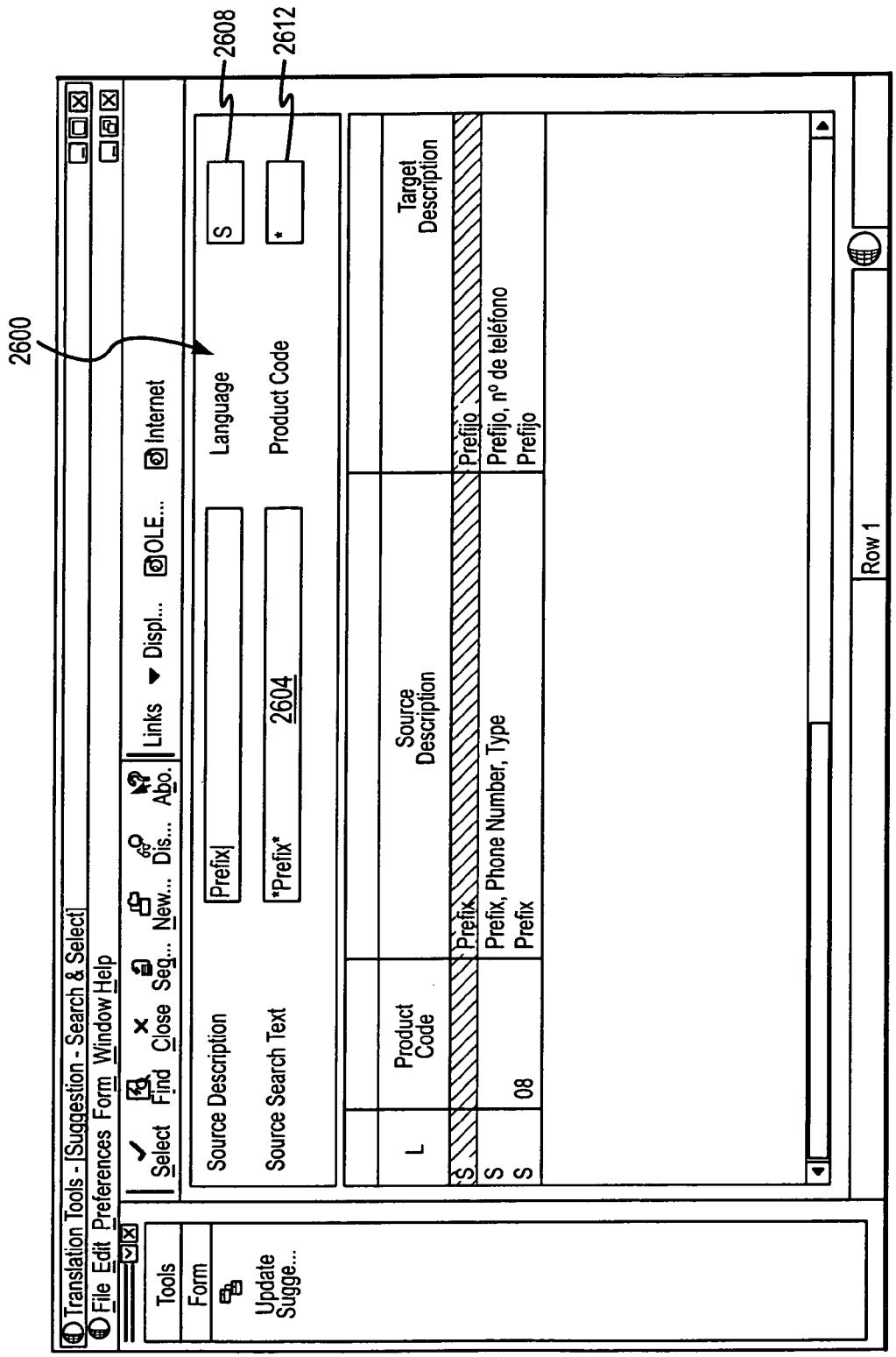

As shown in FIG. 26, a suggested translation can be displayed in a suggestion window 2600. In general, the suggestion window 2600 can be accessed by selecting the suggestion icon 1944 (see FIG. 19). Accordingly, whenever a suggested translation is available, the translator may access detailed information regarding the suggestion by activating the suggestion window 2600. The information includes a description of the source record and the target. In addition, a product code may be provided if available. In addition, a source search text edit box 2604 may be provided to allow the translator to alter the search that is performed. In general, as shown in the example of FIG. 26, a search for the selected text in the source language is conducted when the suggestion window 2600 is selected, with any characters on either side of that text. Furthermore, the translator may select the target language into which the selected text is to be translated by entering the appropriate language code in language code box 2608. The product code may also be specified in product code box 2612.

Figure 27:
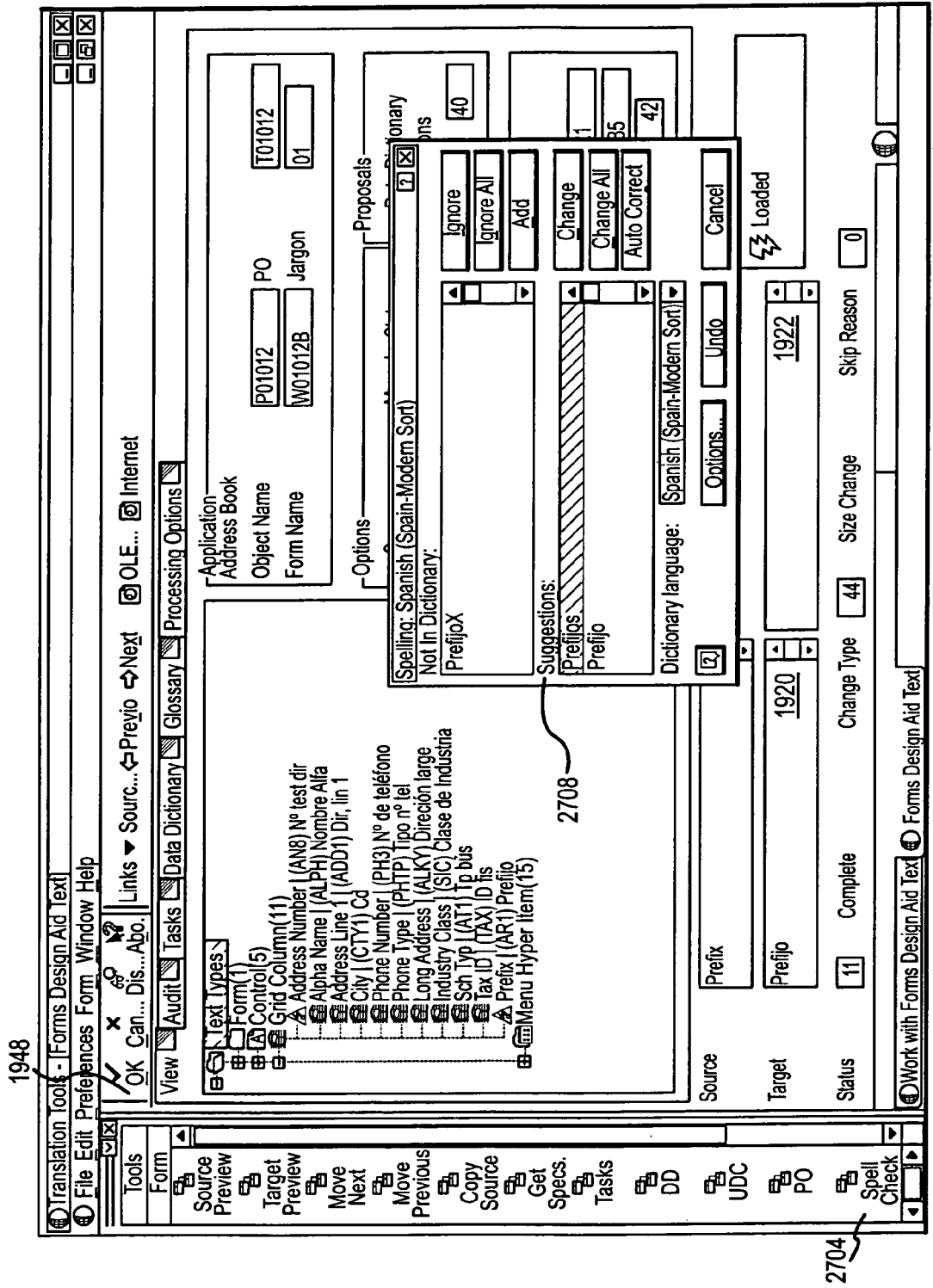

As shown in FIG. 27, the translation application 124 provides spell checking capabilities in the target language. In accordance with an embodiment of the present invention, a spell check of text entered in the target text edit box 1920, 1922 can be spell checked by selecting a button 2704. Alternatively, the spell check function can be activated when the user selects the OK button 1948 if spell checking is activated in the processing options (see FIG. 15) for the user. If the spell check detects an error, a spell check window 2708 is displayed that allows the user to select a suggested alternative to the text entered by the user, or to ignore the suggestion. It should be appreciated that the spell check is provided for the target text entered in the target text edit boxes 1920 and 1922 (if any) in the target language, even though the translation application 124 itself uses a different language (e.g., the same language as the source program being translated). Accordingly, the translation application 124 accesses spell check libraries relevant to the activated target language.

Figure 28:
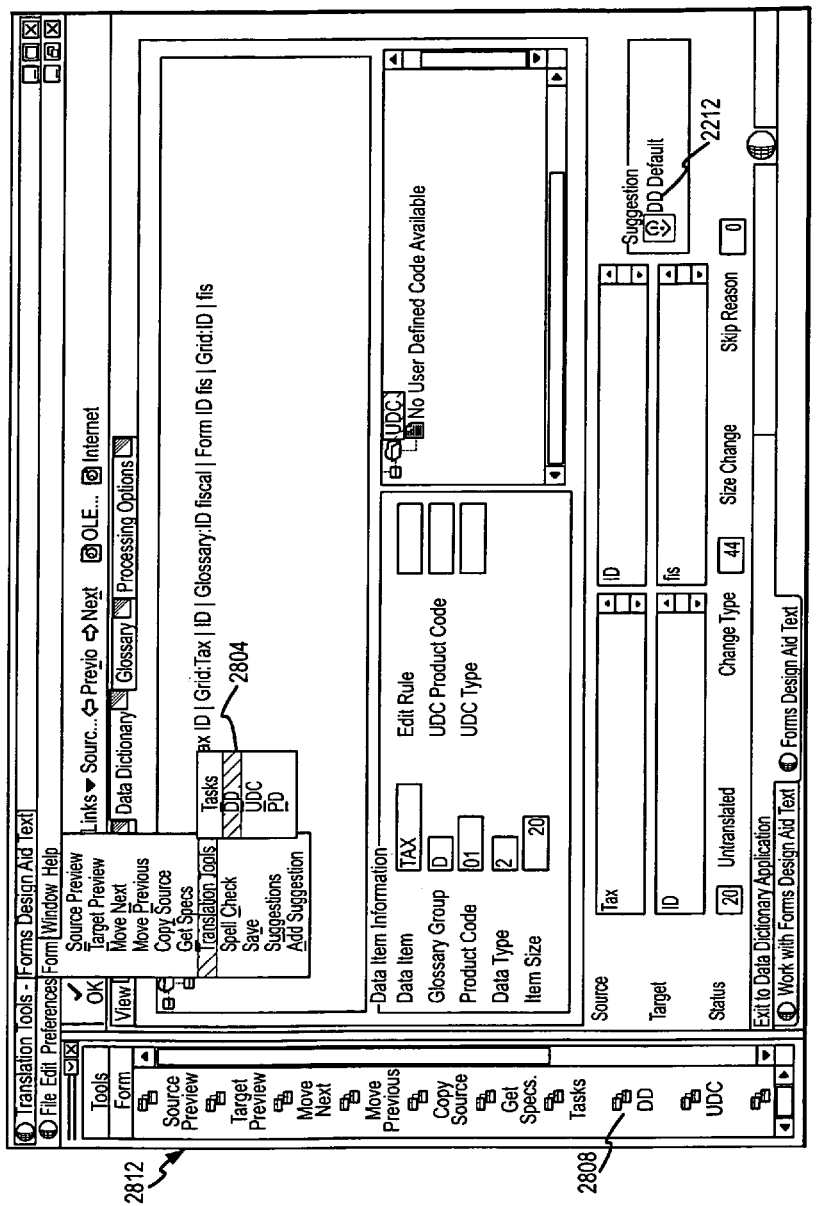

In FIG. 28, an example of menu items available to a user of the translation application 124 is shown. In particular, FIG. 28 illustrates that various translation tools may be accessed through menus. For example, the data dictionary may be accessed by selecting the DD menu item 2804, by selecting the DD icon 2212 (see FIG. 22), by selecting the DD tree 2204 (see FIG. 22), or by selecting the DD button 2808 in the form bar 2812.

Figure 29:
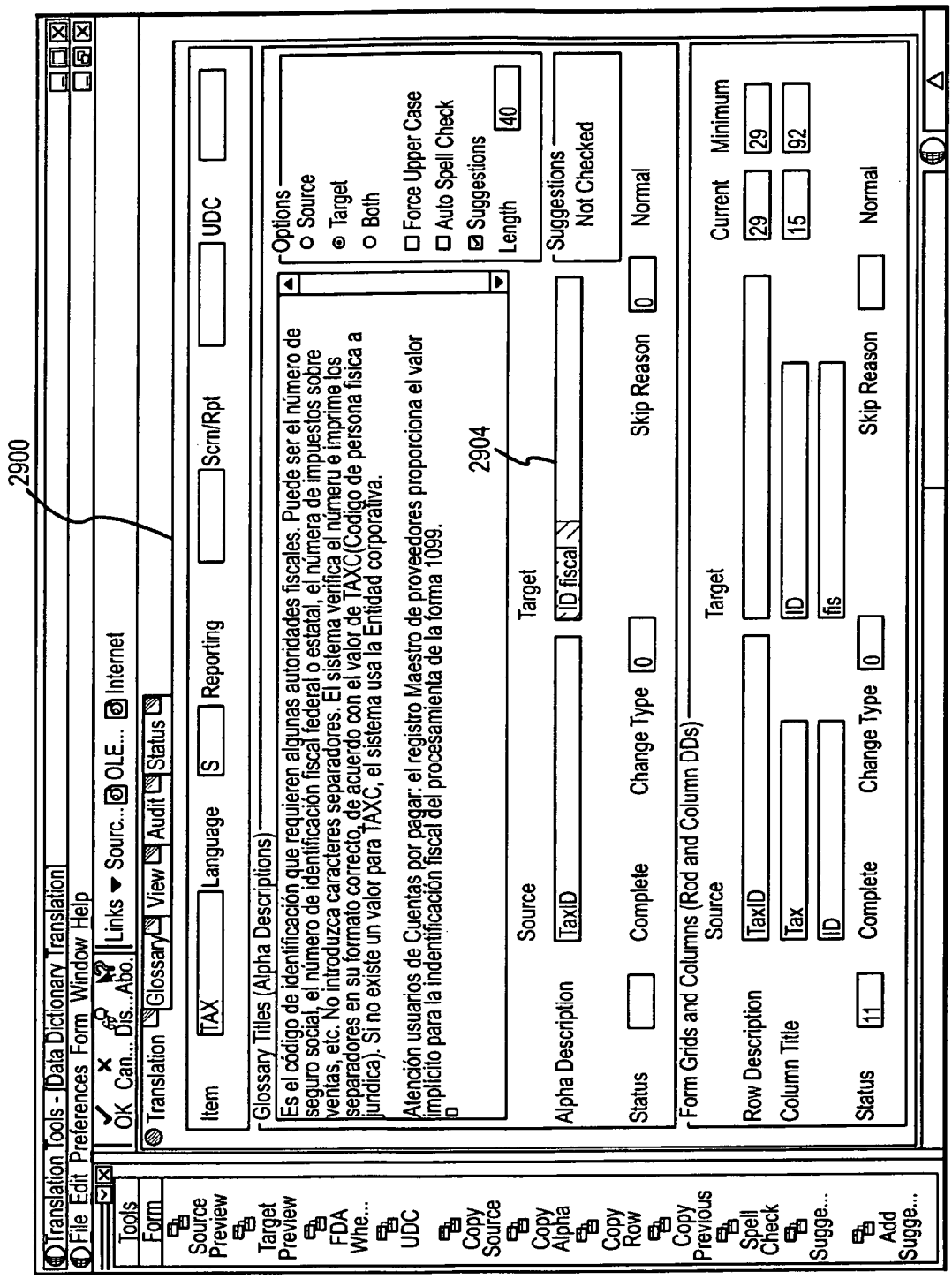

In FIG. 29, a data dictionary translation window 2900 is illustrated. The data dictionary translation window 2900 allows a user to search for entries in the data dictionary by entering a description of the text for which information is sought in an alpha description window 2904. Any entries in the data dictionary related to the text entered in the alpha description box 2904 can be shown in the source language, the target language, or both the source and target language by selecting the appropriate option 2908.

Figure 30:
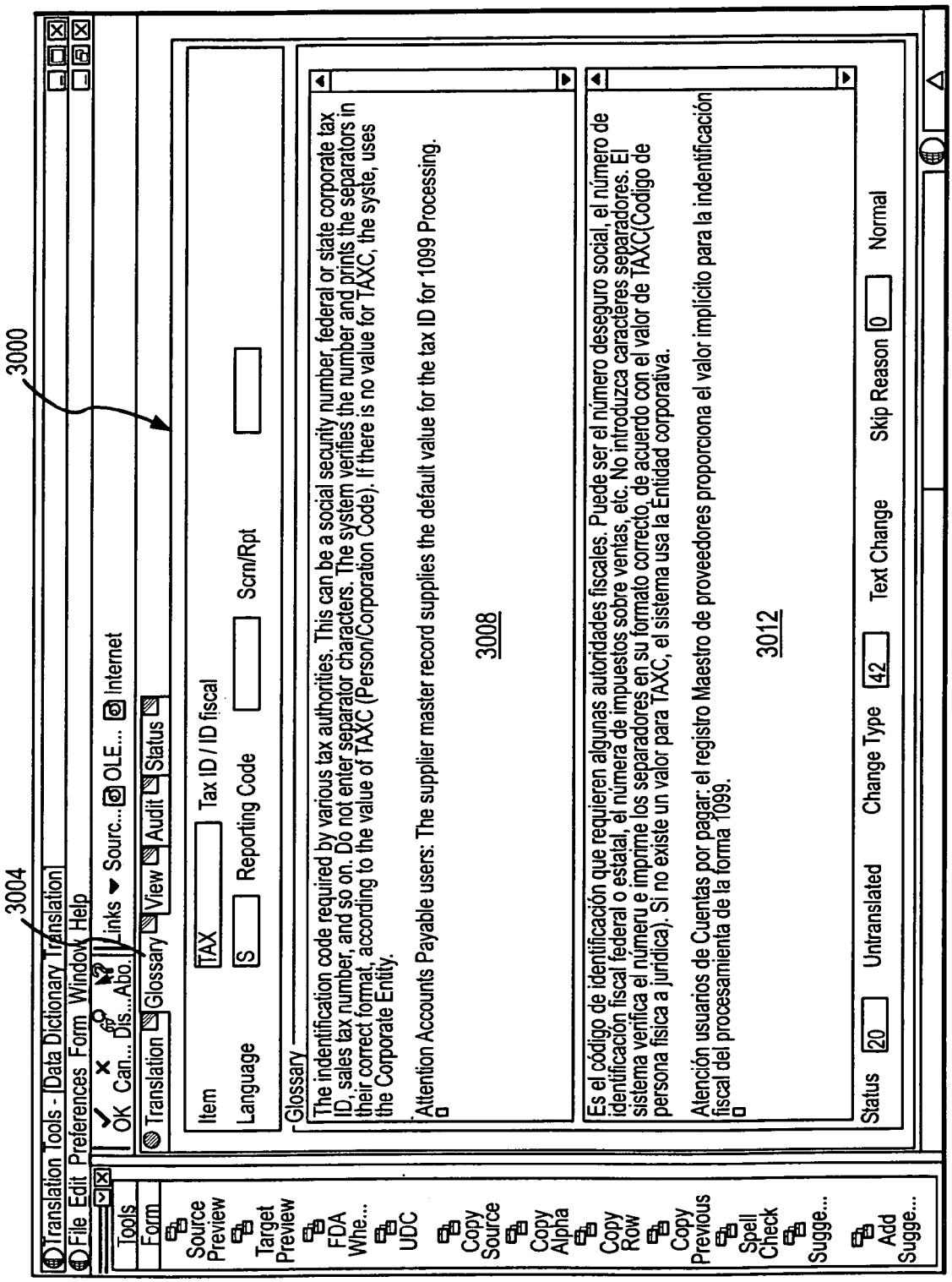

With reference now to FIG. 30, a data dictionary translation window with the glossary tab selected 3000 is illustrated. With the glossary tab 3004 selected, the glossary entry found in connection with the search term entered in the alpha description text box 2904 (see FIG. 29) is shown together with the source text version of the glossary entry. In addition, the source text and the target text are shown in edit boxes 3008, 3012 so that the glossary entries can be edited.

Figure 31:
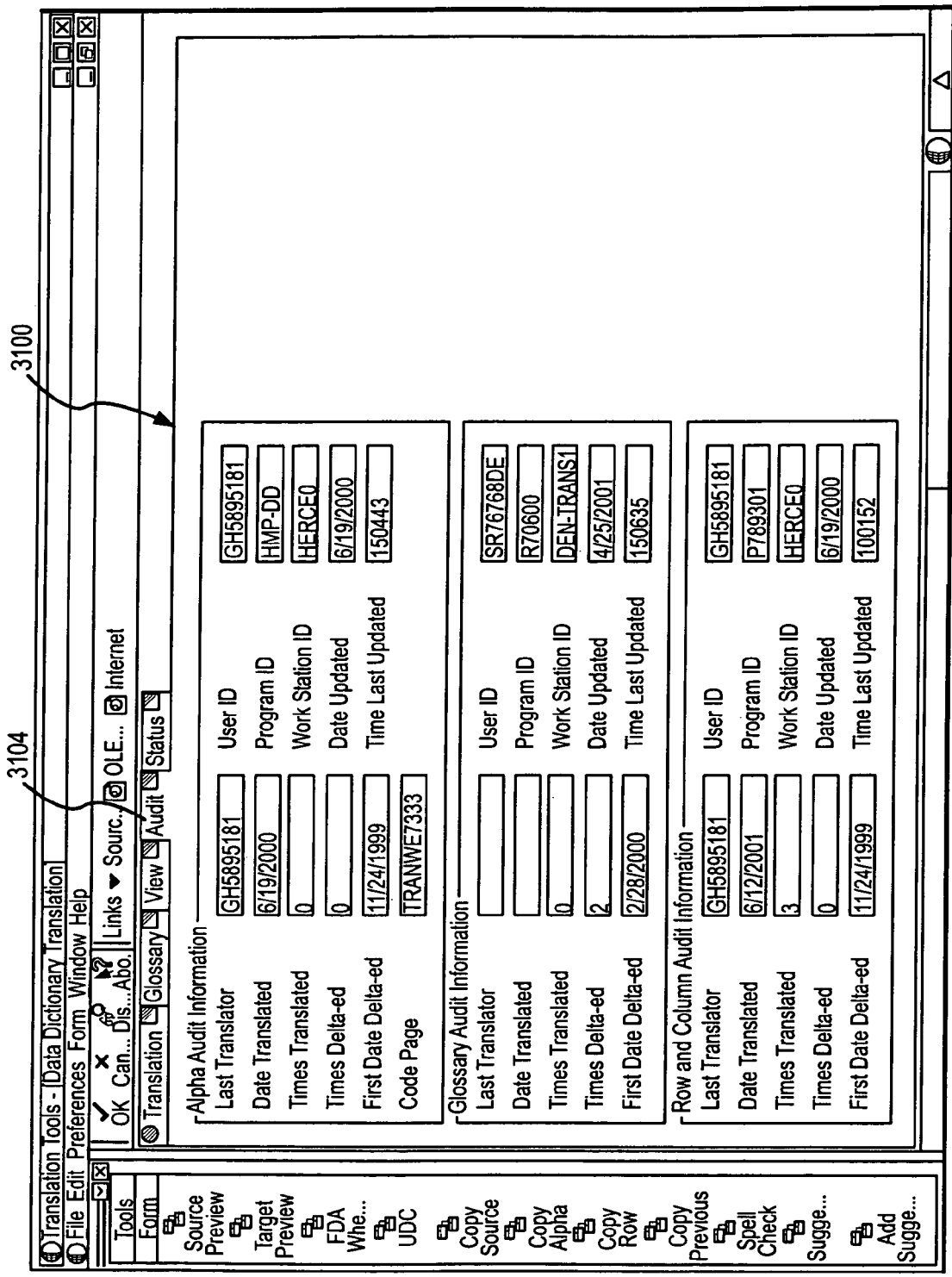

In FIG. 31, a data dictionary translation screen 3100 with the audit tab 3104 selected is illustrated. In general, the audit information includes information regarding when items were last translated and how many times compare functions have been run with respect to those data dictionary items.

Figure 32:
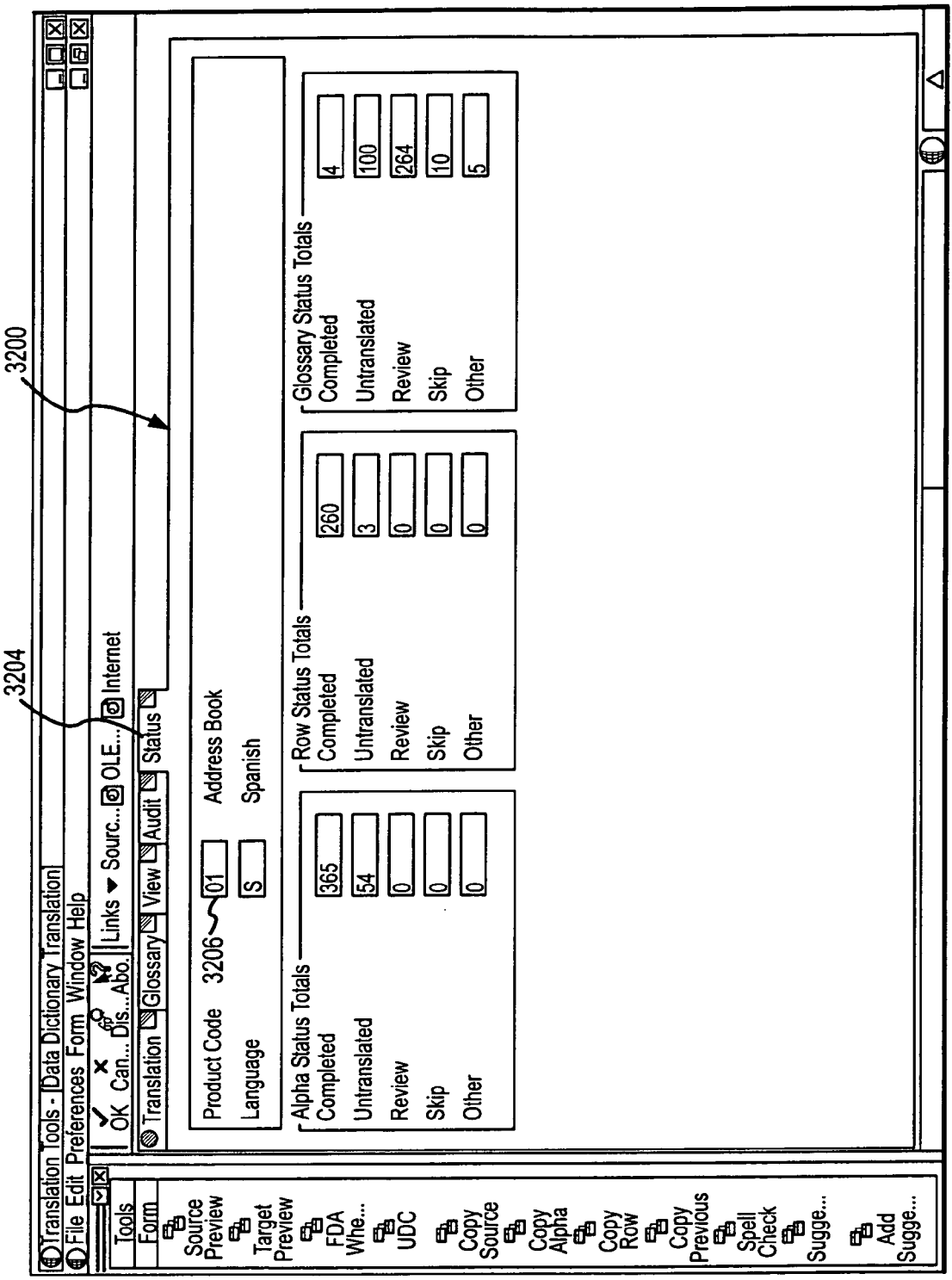

In FIG. 32, a data dictionary translation window 3200 with the status tab 3204 selected is illustrated. The information provided by this window 3200 assists translators and administrators in determining how many records remain to be translated and/or reviewed for the current product code 3206. Such information is useful in determining further workloads and translation schedules.

Figure 33:
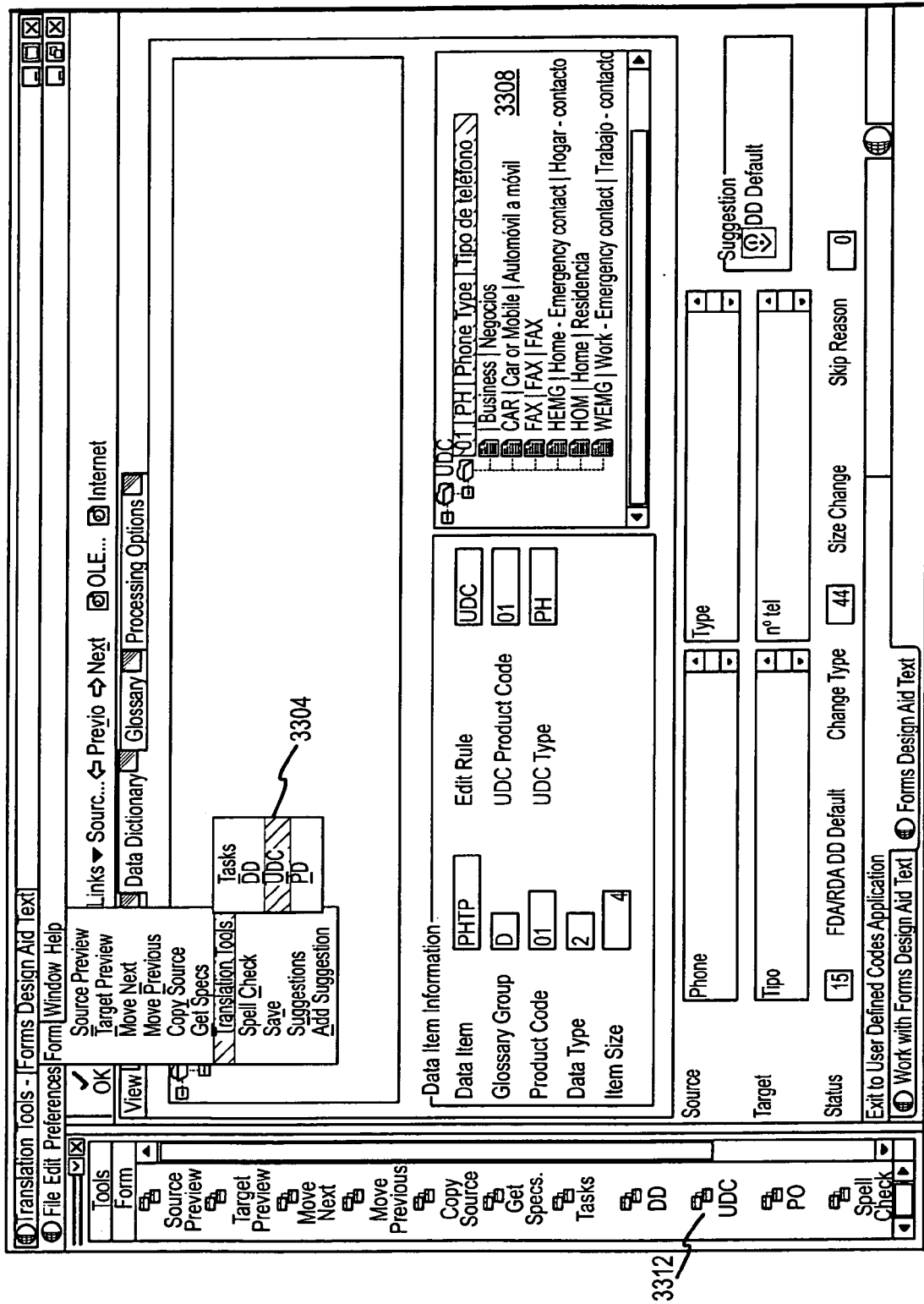

In FIG. 33, various methods of navigating to user defined codes (UDCs) are illustrated. For example, the UDC menu item 3304 may be selected. Alternatively, the UDC information may be edited by selecting particular instances of that information in the tree view window 3308. User defined codes may additionally be accessed by selecting the UDC button 3312. Accordingly, it should be appreciated that the translation application 124 allows a translator to search for records of a particular type, for example when problems with such records have been detected. Thus, in addition to allowing searches for records having a particular status, groups of records may be returned in response to searches that do not require the records to have a particular status.

Figure 34:
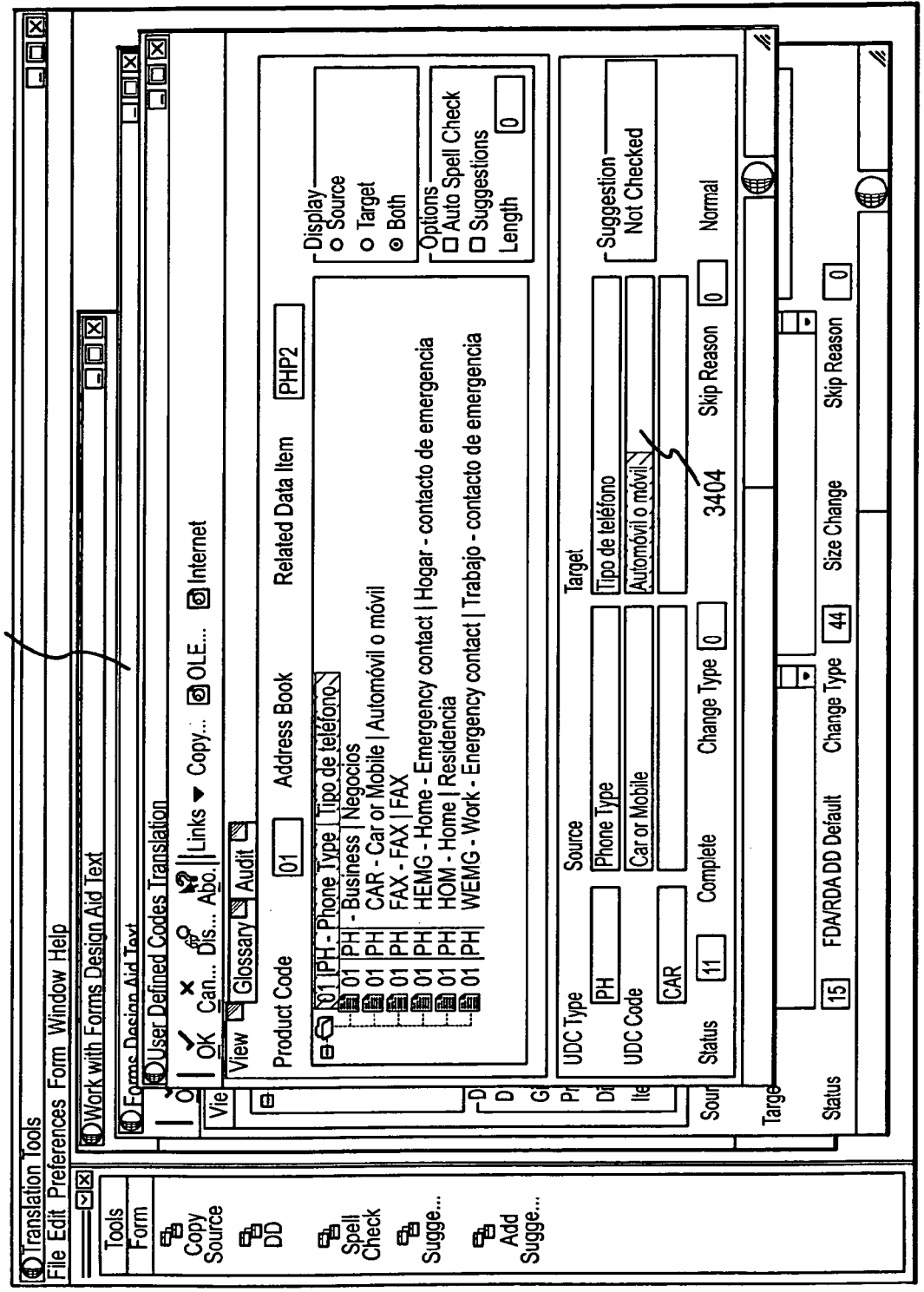

In FIG. 34, a user defined codes translation window 3400 is illustrated. In general, the user defined codes translation window 3400 may be accessed in any of the ways described above in connection with FIG. 33. Target text included in the user defined codes may be edited in the target text edit box 3404.

Figure 35:
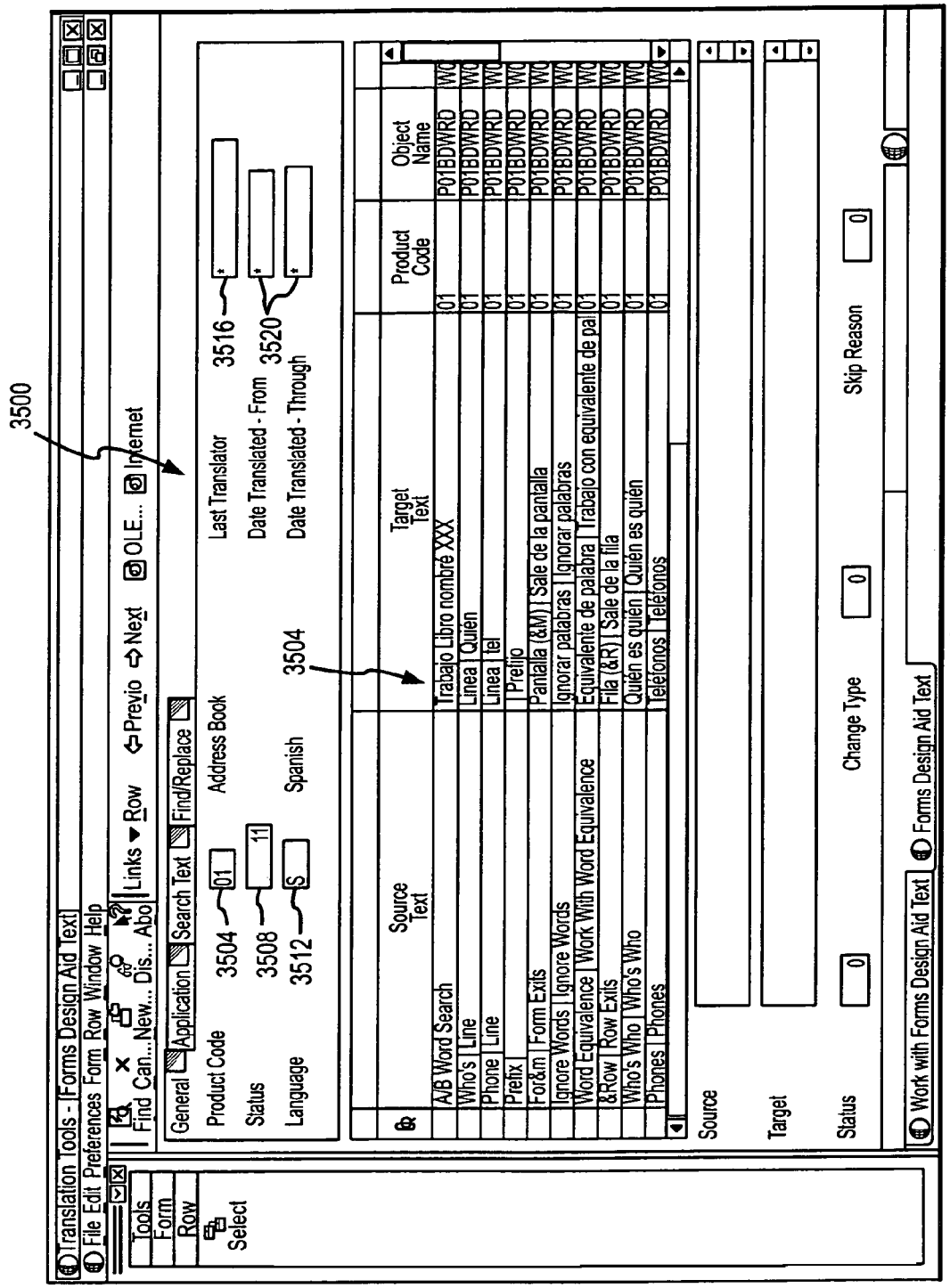

In FIG. 35, a search and replace window 3500 is illustrated. The search and replace window allows a translator to search for records containing source text by specifying various criteria. Such criteria may include the product code 3504 with which the desired record is associated, the status of the records 3508, the target language 3512, the last translator 3516, and the dates of translation 3520. The source text, target text and other information concerning records returned as a result of the search are displayed in the results window 3504.

Figure 36:
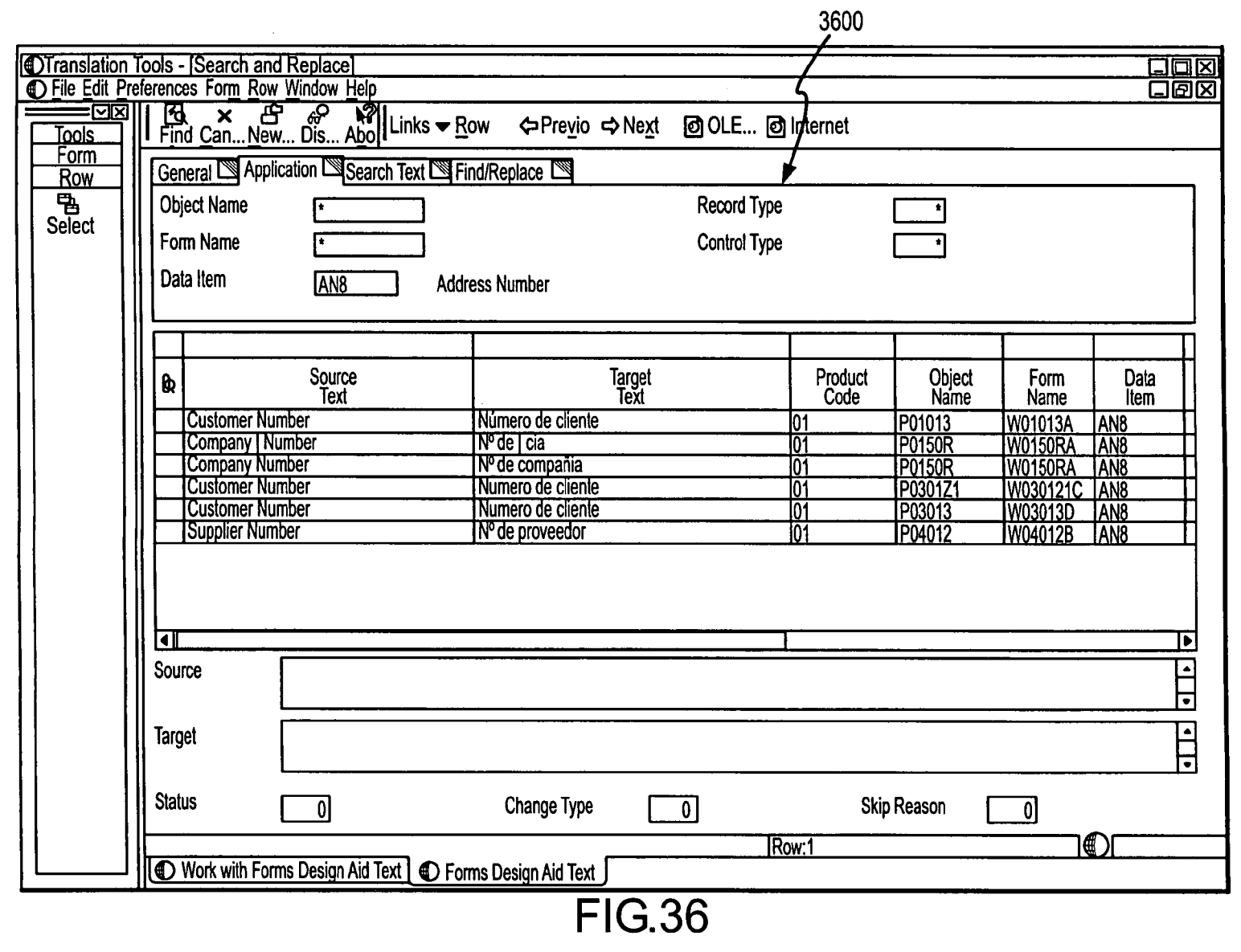

In FIG. 36, a search and replace application window 3600 is illustrated. In general, the search and replace application window 3600 provides different types of search terms with which records can be searched as compared to the general search and replace window 3500.

With reference now to FIG. 37, a search and replace search text window 3700 is illustrated. The search and replace search text window 3700 provides a source text entry box 3704 and a target text entry box 3708 in which text that is to be searched for can be entered. As shown in FIG. 37, the entered text may include wild card characters. In addition, selections regarding the primary search 3712 and secondary search 3716 options can be selected. For example, the primary search options 3712 include a choice of either the source records or target text records. This allows significant flexibility in configuring the search. For example, as shown in FIG. 37, when the source text records are selected in the primary search options 3712, those records containing the word "address" (i.e. the term entered in the source text data box 3704) will be found. Then, from among those records containing the word "address", records having the target text "direc" will be returned. The capability to perform tiered searches is especially useful in searching for records having known errors.

Figure 38:
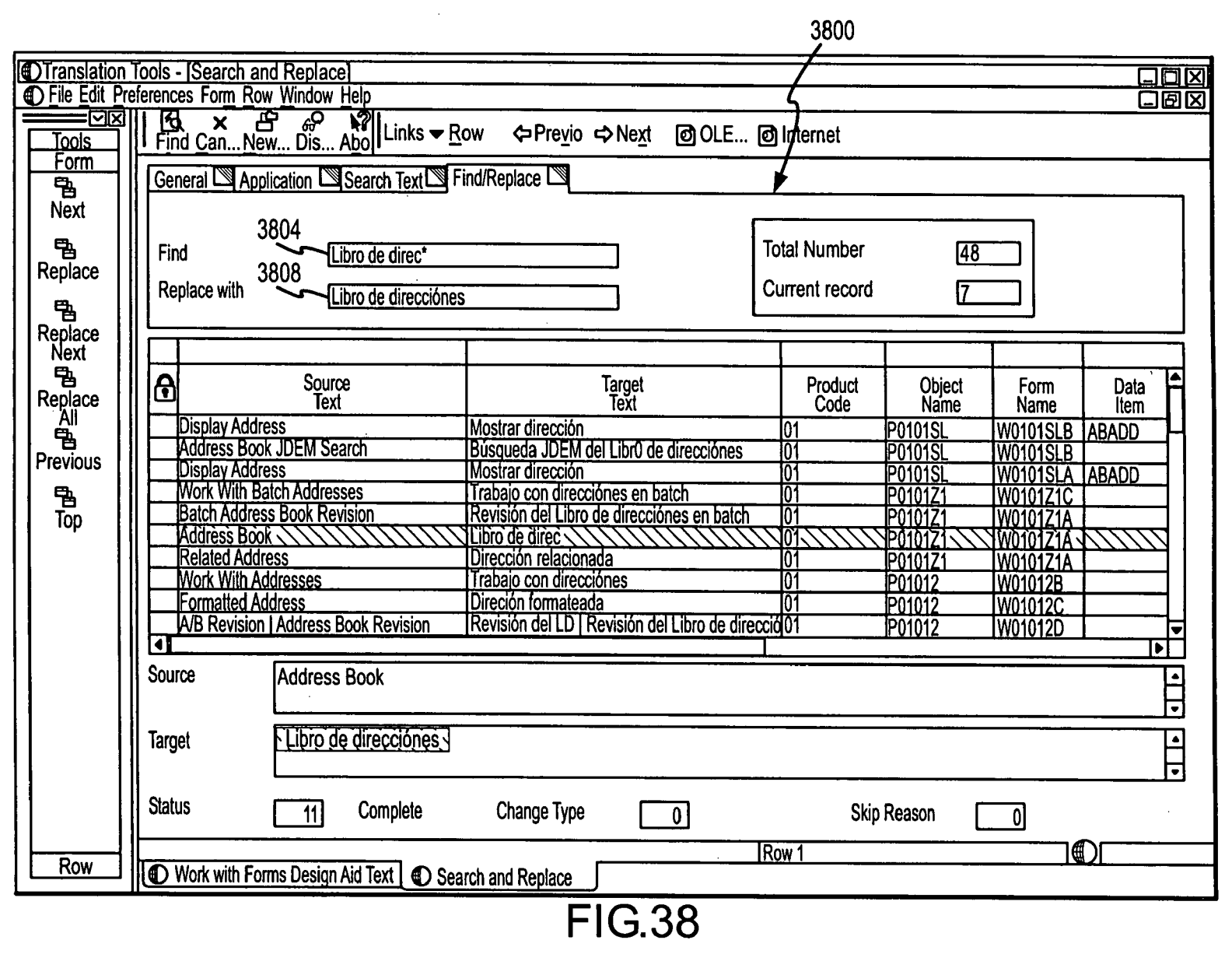

In FIG. 38, a search and replace find and replace window 3800 is illustrated. Using the find and replace window 3800, a translator may find records containing selected target language text, entered using the find edit box 3804 and replace that text with text entered in the replace with edit box 3808. Accordingly, the task of, for example, finding known errors in records and substituting corrected target text can be automated.

From the above description, it is apparent that the present invention facilitates the translation of natural language text from a source language to one or more target languages. In particular, the present invention allows translations to be performed in parallel with development of the computer program from which the source text is derived. In addition to allowing such parallel development, the present invention provides information regarding the status of a translation into a target language, assisting in the efficient allocation of tasks, and in the accurate estimation of work loads. Furthermore, the present invention provides an interface that allows translators and administrators to easily manipulate records and obtain data regarding the translation process from a number of discrete but interrelated tables.

In addition to the organization structure and status information provided by the present invention, the task of translating text is facilitated by the present invention. In particular, translators are provided with the source text and their translation of the text, or a previous or suggested translation of the source text, simultaneously. Accordingly, translators need not change between different screens in order to view the source text and a translation of the text. In addition, by selectively providing suggested translations, the need for a translator to manually type in translations is reduced. Furthermore, the present invention allows both source text and text translated into a target language to be displayed, either alone or simultaneously. Such "in-context" views assist translators in preparing translations.

The present invention also allows translators to navigate among records containing natural language text in a variety of ways. Therefore, translators can merely define groups of records, and then select individual records from defined groups for translation or review. Information related to the status of individual records can be entered automatically in connection with the translation, again reducing the workload on the translator and facilitating the timely development of translated programs.

Although the description of the present invention has largely been in terms of translating text from a source language into one or more target languages, the present invention is not so limited. For example, the status information provided by the present invention is useful in connection with the proofing of source text contained in records. In addition, the present invention is useful in connection with the development of documentation concerning the source computer program.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of developing multiple natural language versions of software, the method comprising:

providing a first iteration of a computer program, wherein the computer program comprises natural language portions of source text in a first natural language;

providing an interface for a translator to provide a translation of at least some of the natural language portions of the source text into a second natural language, wherein the providing of the interface for the translator is configured to allow the translator to translate the natural language portions of the source text in parallel with the development of the source text of the computer program;

displaying, for the translator, within a first graphical display window of the interface, a first version of the natural language potions of the source text of the computer program in the first natural language, the first graphical display window displaying the source text in the first natural language as it will appear in the first version of the computer program;

displaying, for the translator, within a second graphical display window of the interface, a second version of the natural language portions of the computer program in the second natural language, the second graphical display window comprising the translation of the source text in the second natural language as it will appear in the second version of the computer program;
receiving modifications to the natural language portions of the source text;
based on the received modifications to the natural language portions of the source text, updating an update status table, wherein the update status table includes a record of the modifications made to the natural language portions of the source text;
displaying, for the translator, within a third graphical display window of the interface the updated status table to indicate the modifications made to the natural language portions of the source text, wherein the first, second, and third graphical display windows are simultaneously displayed in the interface; and
receiving translation of the modified portions of the natural language portions of the source text from the first natural language to the second natural language.

2. The method of claim 1, wherein the first display screen and the second display screen are displayed simultaneously.

3. The method of claim 1, wherein a first component of the computer program comprises the source text in the first natural language, wherein the second version of the computer program is a target software program, and wherein providing an interface for the translator to provide a translation of at least some of the source text into a second natural language comprises providing for the translation of the first component of the software program into the second natural language to produce a translated first component, such that the translated first component is part of the target software program.

4. The method of claim 3, further comprising:
determining a translation status of the first component; and
after providing for the translation of the of the first component, updating a translation status of the first component.

5. The method of claim 1, further comprising:
monitoring development of the computer program, wherein the interface is provided for the translator in response to detection of a revision of the computer program.

6. A system for developing multiple natural language versions of software, the system comprising:
a processor;
a storage device in communication with the processor; and
a set of instructions executable by the processor, the set of instructions comprising:
instructions for providing a first iteration of a computer program, wherein the computer program comprises natural language portions of source text in a first natural language;
instructions for providing an interface for a translator to provide a translation of at least some of the natural language portions of the source text into a second natural language, wherein the providing of the interface for the translator is configured to allow the translator to translate the natural language portions of the source text in parallel with the development of the source text of the computer program;
instructions for displaying, for the translator, within a first graphical display window of the interface, a first version of the natural language potions of the source text of the computer program in the first natural language, the first graphical display window displaying the source text in the first natural language as it will appear in the first version of the computer program;
instructions for displaying, for the translator, within a second graphical display window of the interface, a second version of the natural language portions of the computer program in the second natural language, the second graphical display window comprising the translation of the source text in the second natural language as it will appear in the second version of the computer program;
instructions for receiving modifications to the natural language portions of the source text;
instructions for based on the received modifications to the natural language portions of the source text, updating an update status table, wherein the update status table includes a record of the modifications made to the natural language portions of the source text;
instructions for displaying, for the translator, within a third graphical display window of the interface the updated status table to indicate the modifications made to the natural language portions of the source text, wherein the first second, and third graphical display windows are simultaneously displayed in the interface; and
instructions for receiving translation of the modified portions of the natural language portions of the source text from the first natural language to the second natural language.

7. A computer-readable medium comprising a set of instructions stored thereon, executable by one or more computers, the set of instructions comprising:
instructions for providing a first iteration of a computer program, wherein the computer program comprises natural language portions of source text in a first natural language;
instructions for providing an interface for a translator to provide a translation of at least some of the natural language portions of the source text into a second natural language, wherein the providing of the interface for the translator is-configured to allow the translator to translate the natural language portions of the source text in parallel with the development of the source text of the computer program;
instructions for displaying, for the translator, within a first graphical display window of the interface, a first version of the natural language potions of the source text of the computer program in the first natural language, the first graphical display window displaying the source text in the first natural language as it will appear in the first version of the computer program;
instructions for displaying, for the translator, within a second graphical display window of the interface, a second version of the natural language portions of the computer program in the second natural language, the second graphical display window comprising the translation of the source text in the second natural language as it will appear in the second version of the computer program;
instructions for receiving modifications to the natural language portions of the source text;
instructions for based on the received modifications to the natural language portions of the source text, updating an update status table, wherein the update status table includes a record of the modifications made to the natural language portions of the source text;
instructions for displaying, for the translator, within a third graphical display window of the interface the updated status table to indicate the modifications made to the natural language portions of the source text, wherein the first, second, and third graphical display windows are simultaneously displayed in the interface; and instructions for receiving translation of the modified portions of the natural language portions of the source text from the first natural language to the second natural language.

8. A system, comprising:

means for providing a first iteration of a computer program, wherein the computer program comprises natural language portions of source text in a first natural language;

means for providing an interface for a translator to provide a translation of at least some of the natural language portions of the source text into a second natural language, wherein the providing of the interface for the translator is configured to allow the translator to translate the natural language portions of the source text in parallel with the development of the source text of the computer program;

means for displaying, for the translator, within a first graphical display window of the interface, a first version of the natural language potions of the source text of the computer program in the first natural language, the first graphical display window displaying the source text in the first natural language as it will appear in the first version of the computer program;

means for displaying, for the translator, within a second graphical display window of the interface, a second version of the natural language portions of the computer program in the second natural language, the second graphical display window comprising the translation of the source text in the second natural language as it will appear in the second version of the computer program;

means for receiving modifications to the natural language portions of the source text;

means for based on the received modifications to the natural language portions of the source text, updating an update status table, wherein the update status table includes a record of the modifications made to the natural language portions of the source text;

means for displaying, for the translator, within a third graphical display window of the interface the updated status table to indicate the modifications made to the natural language portions of the source text, wherein the first, second, and third graphical display windows are simultaneously displayed in the interface; and means for receiving translation of the modified portions of the natural language portions of the source text from the first natural language to the second natural language.

* * * * *

UNITED STATES PATENT AND TRADEMARK OFFICE
CERTIFICATE OF CORRECTION

| | | |
|---|---|---|
| PATENT NO. | : 7,536,294 B1 | Page 1 of 1 |
| APPLICATION NO. | : 10/042658 | |
| DATED | : May 19, 2009 | |
| INVENTOR(S) | : Stanz et al. | |

It is certified that error appears in the above-identified patent and that said Letters Patent is hereby corrected as shown below:

On the title page, under "U.S. Patent Documents", in column 2, on line 19, insert -- 6,311,151 10/2001 Yamamoto et al. 704/8 --.

On the title page, under "U.S. Patent Documents", in column 2, on line 20, insert -- 5,542,837 7/1996 Fushimoto 704/2 --.

On the title page, under "U.S. Patent Documents", in column 2, on line 21, insert -- 5,201,042 4/1993 Weisner et al. 704/2 --.

On the title page, under "U.S. Patent Documents", in column 2, on line 22, insert -- 6,092,036 7/2000 Hamann 704/8 --.

On the title page, under "U.S. Patent Documents", in column 2, on line 23, insert -- 6,345,243 2/2002 Clark 704/2 --.

In column 20, line 60, in claim 1, delete "potions" and insert -- portions --, therefor.

In column 21, line 35, in claim 4, before "first" delete "of the".

In column 21, line 63, in claim 6, delete "potions" and insert -- portions --, therefor.

In column 22, line 21, in claim 6, delete "first second" and insert -- first, second --, therefor.

In column 22, line 39, in claim 7, delete "is-configured" and insert -- is configured --, therefor.

In column 22, line 45, in claim 7, delete "potions" and insert -- portions --, therefor.

In column 23, line 21, in claim 8, delete "potions" and insert -- portions --, therefor.

Signed and Sealed this
First Day of May, 2012

David J. Kappos
*Director of the United States Patent and Trademark Office*